(12) United States Patent
Gambetta et al.

(10) Patent No.: US 11,456,611 B2
(45) Date of Patent: Sep. 27, 2022

(54) POWER MANAGEMENT CIRCUIT

(71) Applicant: Dialog Semiconductor (UK) Limited, London (GB)

(72) Inventors: Pietro Gambetta, Leghorn (IT); Mark Mercer, Phoenix, AZ (US)

(73) Assignee: Dialog Semiconductor (UK) Limited, London (GB)

(*) Notice: Subject to any disclaimer, the term of this patent is extended or adjusted under 35 U.S.C. 154(b) by 244 days.

(21) Appl. No.: 16/727,783

(22) Filed: Dec. 26, 2019

(65) Prior Publication Data

US 2021/0203179 A1 Jul. 1, 2021

(51) Int. Cl.
*H02J 7/24* (2006.01)
*H02J 7/00* (2006.01)
*H02M 3/158* (2006.01)

(52) U.S. Cl.
CPC ..... *H02J 7/007182* (2020.01); *H02M 3/1582* (2013.01)

(58) Field of Classification Search
None
See application file for complete search history.

(56) References Cited

U.S. PATENT DOCUMENTS

| | | | |
|---|---|---|---|
| 9,970,979 | B2 | 5/2018 | Gema et al. |
| 10,014,777 | B1* | 7/2018 | Shumkov ............ H02M 3/1582 |
| 10,038,328 | B2 | 7/2018 | Tonarelli et al. |
| 10,205,378 | B2 | 2/2019 | Gema et al. |
| 10,778,026 | B2* | 9/2020 | Langlinais ................ H02J 7/00 |
| 2005/0264271 | A1 | 12/2005 | Lam et al. |
| 2008/0129219 | A1* | 6/2008 | Smith ................. H02M 3/1584 315/291 |
| 2008/0136387 | A1* | 6/2008 | Bertele ............... H02M 3/1582 323/282 |
| 2009/0251106 | A1 | 10/2009 | Samstad |

(Continued)

FOREIGN PATENT DOCUMENTS

DE 10 2006 034 804 A1 1/2008

OTHER PUBLICATIONS

"Single-Inductor Multiple-Output Switching Converters," by Wing-Hung Ki et al., IEEE Annual Power Electronics Specialists Conference, Feb. 2001, pp. 226-231.

(Continued)

*Primary Examiner* — Arun C Williams
(74) *Attorney, Agent, or Firm* — Saile Ackerman LLC; Stephen B. Ackerman

(57) ABSTRACT

A method of managing power and a power management circuit operable in a plurality of modes are presented. The power management circuit includes a three terminals switching converter coupled to a controller. The switching converter has a single inductor, two sets of switches, a bypass switch and a transition switch. The first set of switches is coupled to an input terminal. The second set of switches is coupled to a battery terminal. The bypass switch is coupled between the battery terminal and a load terminal. The single inductor is provided between a first switching node and a second switching node. The transition switch is provided between the first switching node and the battery or the load terminal. A controller is configured to select a mode of operation by changing a state of at least one of the bypass switch and the transition switch.

22 Claims, 27 Drawing Sheets

(56) References Cited

U.S. PATENT DOCUMENTS

| | | |
|---|---|---|
| 2010/0231185 A1 | 9/2010 | Yu et al. |
| 2012/0001610 A1 | 1/2012 | Klein |
| 2012/0062030 A1 | 3/2012 | Xu et al. |
| 2013/0049699 A1* | 2/2013 | Jayaraman ............ H02M 5/458 |
| | | 320/137 |
| 2014/0225577 A1 | 8/2014 | Ivanov et al. |
| 2016/0064986 A1 | 3/2016 | Langlinais et al. |
| 2016/0099640 A1* | 4/2016 | Cho .................... H02M 3/1582 |
| | | 323/271 |
| 2016/0105110 A1* | 4/2016 | Houston ............. H02M 3/1582 |
| | | 323/271 |
| 2016/0380455 A1 | 12/2016 | Greening et al. |
| 2017/0025955 A1 | 1/2017 | Hang et al. |
| 2017/0077815 A1* | 3/2017 | Fu ....................... H02M 3/1582 |
| 2017/0085080 A1 | 3/2017 | Huang et al. |
| 2017/0117717 A1 | 4/2017 | Pagano et al. |
| 2018/0041060 A1 | 2/2018 | Walley et al. |
| 2018/0076647 A1 | 3/2018 | Wei et al. |
| 2018/0090944 A1 | 3/2018 | Reddiconto et al. |
| 2018/0090945 A1 | 3/2018 | Langlinais et al. |
| 2018/0337545 A1* | 11/2018 | Crosby ............... H02J 7/00712 |
| 2019/0123646 A1 | 4/2019 | Tarroboiro et al. |
| 2019/0123649 A1 | 4/2019 | Dalena |
| 2020/0106367 A1* | 4/2020 | Bendani ............ H02M 3/33576 |
| 2021/0359595 A1* | 11/2021 | Everts .................... B60L 53/20 |

OTHER PUBLICATIONS

Co-pending U.S. Pat. No. DS19-019, U.S. Appl. No. 16/707,714, filed Dec. 9, 2019, by Giuliano Fernandes Marinelli et al., "3D Coupling Control Rules for Auto-Routing," 48 pages.

"Dual input-Dual output Single Inductor DC-DC Converter for Renewable Energy Applications," by Zubair Rehman et al., 4th International Conference on Renewable Energy Research and Applicaitons, Palermo, Italy, Nov. 22-25, 2015, 6 pages.

"Single-Inductor-Multiple-Output Switching DC-DC Converters," by Dongwon Kwon et al., IEEE Transactions on Circuits and Systems—II: Express Briefs, vol. 56, No. 8, Aug. 2009, pp. 614-618.

German Office Action, File No. 10 2020 204 966.1, Applicant: Dialog Semiconductor (UK) Limited, dated Nov. 2, 2020, 10 pages.

"Characteristics of the Multiple-Input DC-DC Converter," by Hirofumi Matsuo et al., Proceedings of IEEE Power Electronics Specialist Conference—PESC '93, Jun. 20-24, 1993, pp. 115-120.

"Single-Inductor Multiple-Output Switching Converters," by Wing-Hing Ki et al., IEEE Transactions on Circuits and Systems II: Express Briefs (vol. 56, Issue: 8, Aug. 2009), Jul. 31, 2009, pp. 226-231.

German Office Action, File No. 10 2020 204 966.1, Applicant: Dialog Semiconductor (UK) Limited, dated Apr. 21, 2022, 5 pages.

\* cited by examiner

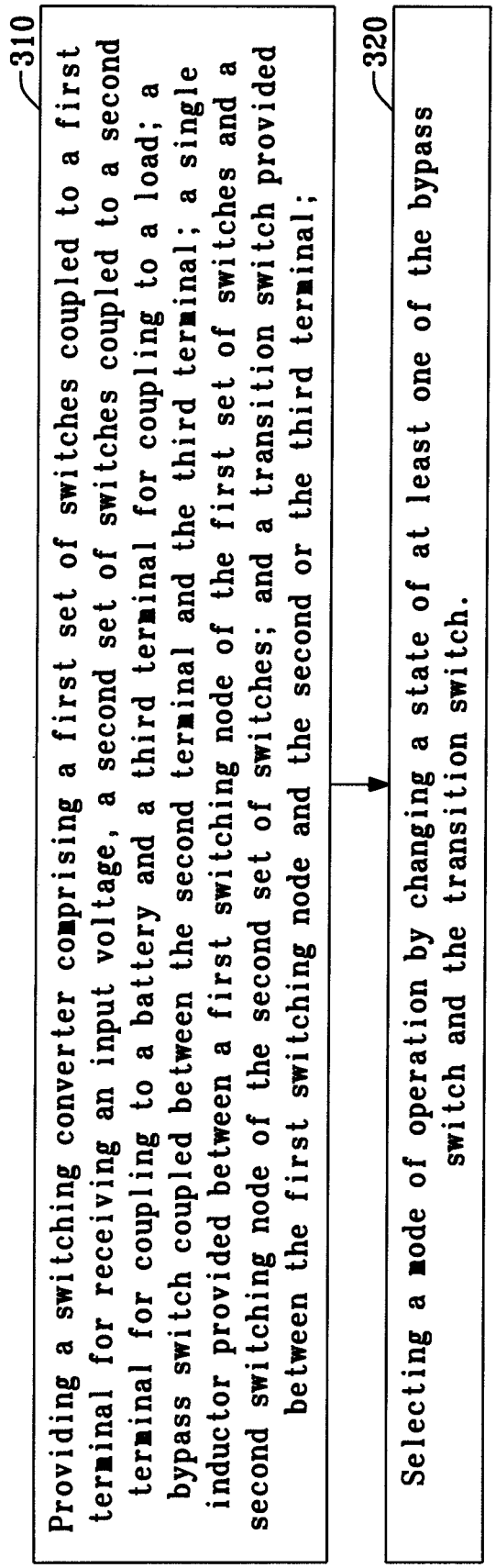

FIG. 3

310 — Providing a switching converter comprising a first set of switches coupled to a first terminal for receiving an input voltage, a second set of switches coupled to a second terminal for coupling to a battery and a third terminal for coupling to a load; a bypass switch coupled between the second terminal and the third terminal; a single inductor provided between a first switching node of the first set of switches and a second switching node of the second set of switches; and a transition switch provided between the first switching node and the second or the third terminal;

320 — Selecting a mode of operation by changing a state of at least one of the bypass switch and the transition switch.

SISO Buck

VHI=VMAIN<VIN

SISO Boost

VHI=VMAIN>VIN

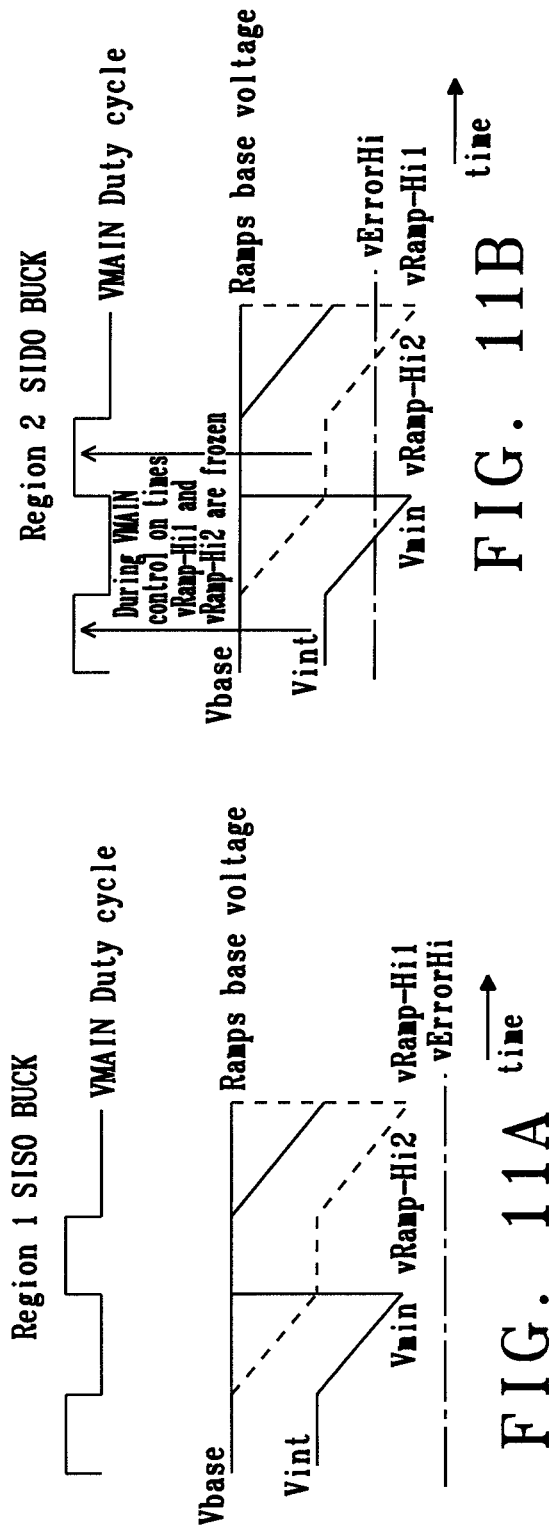
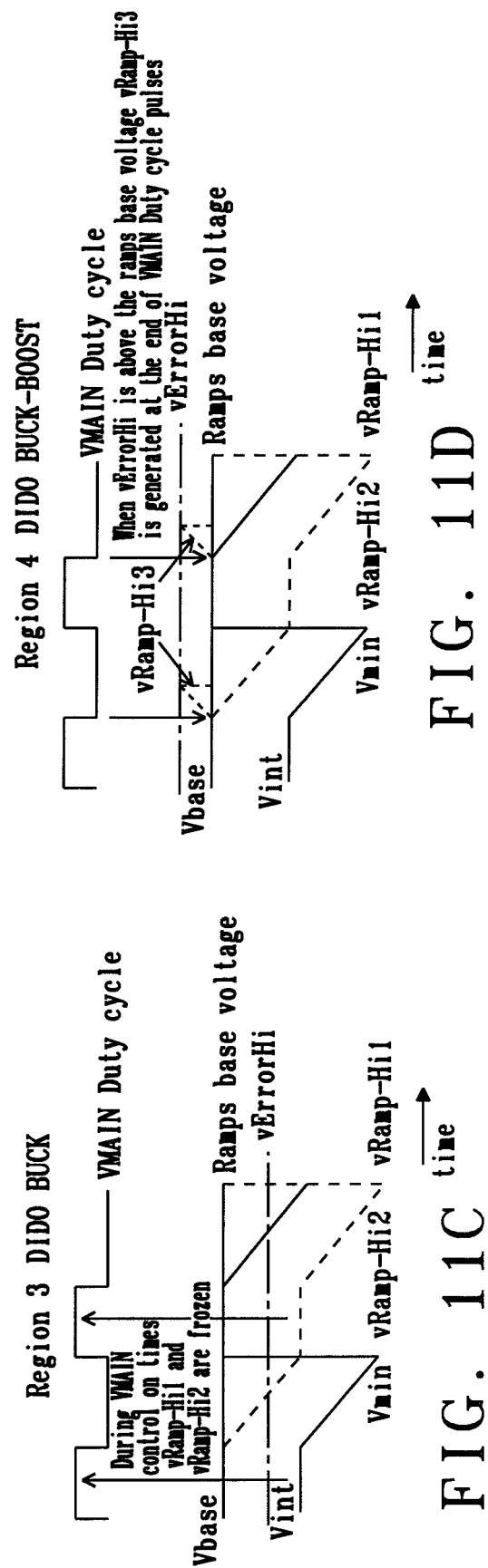
FIG. 11A
FIG. 11B
FIG. 11C
FIG. 11D

FIG. 16 (Boost Mode)

FIG. 17 (Buck Boost Mode)

FIG. 18 (Buck Mode)

POWER MANAGEMENT CIRCUIT

TECHNICAL FIELD

The present disclosure relates to a power management circuit such as a charger for charging a battery of a mobile device. In particular, the present disclosure relates to a three-port battery charger.

BACKGROUND

Mobile devices such as mobile phones and tablet computers are charged using a three-port battery charger having an input port, an input/output battery port and a priority port to deliver power to the mobile device. Conventional three-port battery chargers require at least two inductors, making these devices relatively bulky. These systems operate based on a two steps process in which energy is first transferred to a charger battery and then from the charger battery to the mobile device, hence limiting the efficiency of the charger.

SUMMARY

It is an object of the disclosure to address one or more of the above-mentioned limitations. According to a first aspect of the disclosure there is provided a power management circuit comprising a switching converter coupled to a controller for operating the switching converter in a plurality of modes, the switching converter comprising a first set of switches coupled to a first terminal for receiving an input voltage; a second set of switches coupled to a second terminal for coupling to a battery; a bypass switch coupled between the second terminal and a third terminal for coupling to a load; a single inductor provided between a first switching node of the first set of switches and a second switching node of the second set of switches; and a transition switch provided between the first switching node and the second or the third terminal; wherein the controller is configured to select a mode of operation by changing a state of at least one of the bypass switch and the transition switch.

Optionally, the power management circuit comprises a ramp generator configured to provide a plurality of ramp signals, the controller being adapted to compare one or more ramp signals with a first error signal to transit between the different modes.

Optionally, the controller is adapted to maintain a voltage at the third terminal at or above a predetermined value.

Optionally, the first error signal is proportional to a difference between a sensed voltage at the third terminal and the predetermined value.

Optionally, the ramp generator is adapted to generate a first ramp signal having a first profile, a second ramp signal having a second profile and a third ramp signal having a third profile.

Optionally, the first and second profiles vary between a base voltage, an intermediate voltage lower than the base voltage and a threshold voltage lower than the base voltage and the intermediate voltage, wherein each profile comprises a first, a second and a third period.

Optionally, the first ramp signal decreases from the base voltage to the intermediate voltage during the first period, then remains constant during the second period and decreases from the intermediate voltage to a threshold voltage during the third period.

Optionally, the second ramp signal decreases from the intermediate voltage to the threshold voltage during the first period, then remains constant at the base voltage during the second period and decreases from the base voltage to the intermediate voltage during the third period.

Optionally, the third profile increases during a fourth period.

Optionally, the controller is adapted to close the bypass switch to operate the switching converter as a single input single output buck converter when the first error signal is less than the threshold voltage.

Optionally, the controller is adapted to open the bypass switch and the transition switch to operate the switching converter as a single input dual output buck converter when the first error signal is between the intermediate voltage and the threshold voltage.

Optionally, the controller is adapted to open the bypass switch and close the transition switch to operate the switching converter as a dual input dual output buck converter when the first error signal is between the intermediate voltage and the base voltage.

Optionally, the controller is adapted to open the bypass switch and close the transition switch to operate the switching converter as a dual input dual output buck-boost converter when the first error signal is greater than the base voltage.

Optionally, the first set of switches comprises a first switch coupled to a second switch at a first switching node; and wherein the second set of switches comprises a third switch coupled to a fourth switch at a second switching node.

Optionally, the power management circuit comprises a fifth switch coupled between the second switching node and the third terminal.

Optionally, the controller is adapted to generate a second error signal based on a difference between the voltage at the second terminal and a reference signal.

Optionally, the controller is adapted to provide the inductor current to the second terminal when the second error signal is greater than the first error signal and to provide the inductor current to the third terminal when the second error signal is less than the first error signal.

Optionally, the controller comprises a battery charger controller adapted to generate the second error signal, a comparator adapted to compare the first and second error signal, a driver and a memory device.

Optionally, the power management circuit comprises a current adjuster coupled to the second terminal, the current adjuster being adapted to control a current for charging the battery.

Optionally, the current adjuster comprises a current mirror coupled to a reference circuit adapted to provide a reference battery voltage.

Optionally, the current adjuster comprises a differential amplifier adapted to control the current flowing through the current mirror based on the reference battery voltage.

Optionally, the controller is adapted to operate the switching converter in a buck-boost mode when a voltage is supplied to the first terminal.

According to a second aspect of the disclosure there is provided a method of managing power comprising providing a switching converter comprising a first set of switches coupled to a first terminal for receiving an input voltage; a second set of switches coupled to a second terminal for coupling to a battery; a bypass switch coupled between the second terminal and a third terminal for coupling to a load; a single inductor provided between a first switching node of the first set of switches and a second switching node of the second set of switches; and a transition switch provided between the first switching node and the second or the third terminal; selecting a mode of operation by changing a state of at least one of the bypass switch and the transition switch.

Optionally, the method comprises providing a plurality of ramp signals and comparing one or more ramp signals with a reference to transit between the different modes.

The options described with respect to the first aspect of the disclosure are also common to the second aspect of the disclosure.

BRIEF DESCRIPTION OF THE DRAWINGS

The disclosure is described in further detail below by way of example and with reference to the accompanying drawings, in which:

FIG. 3 is a flow chart of a method for charging a device according to the disclosure;

FIG. 11A is a waveform diagram of the ramp signal voltages generated by the ramp generator for operating the regulator as a SISO buck;

FIG. 11B is a waveform diagram of the ramp signal voltages generated by the ramp generator for operating the regulator as a SIDO buck;

FIG. 11C is a waveform diagram of the ramp signal voltages generated by the ramp generator for operating the regulator as a DIDO buck;

FIG. 11D is a waveform diagram of the ramp signal voltages generated by the ramp generator for operating the regulator as a DIDO buck-boost;

DESCRIPTION

Figure 1:
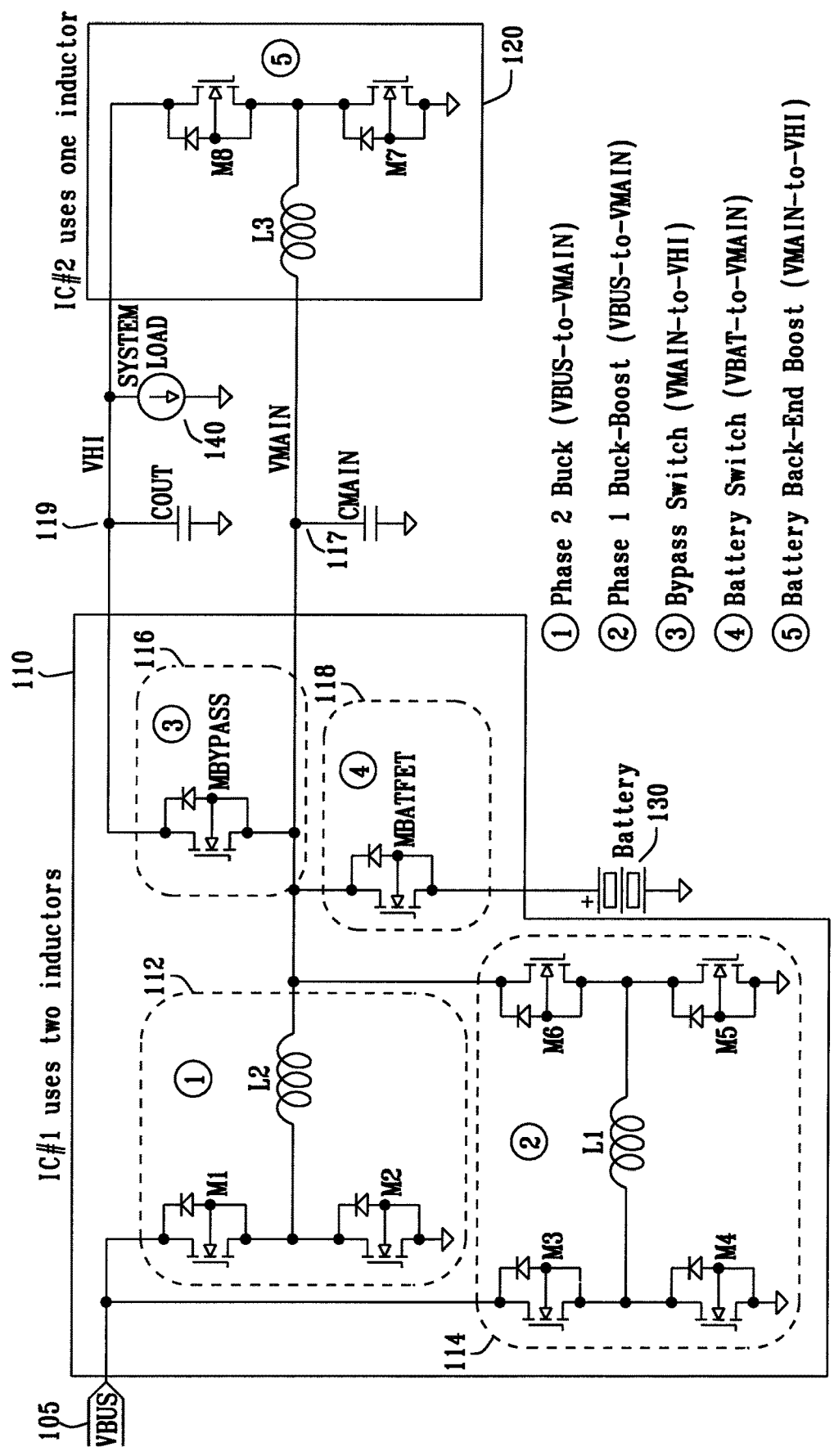
FIG. 1 is a diagram of a three-port battery charger according to the prior art.

FIG. 1 illustrates a conventional three-port battery charger. The charger 100 includes a first integrated circuit chip 110 connected to a second integrated circuit chip 120. The first circuit 110 has an input port 105 for receiving a voltage VIN, also referred to as VBUS, from an external voltage supply such as a travel adapter, a priority output port 119 for providing a voltage VHI, and a battery charger input/output port 117 having a voltage VMAIN.

The first chip 110 has a buck circuit portion 112 and a buck-boost circuit portion 114 for providing the voltage VBUS to the second port (VMAIN). The first chip 110 is also provided with a bypass switch 116 between the battery port 117 and the priority port 119, and a battery switch 118 provided between the battery and the battery port VMAIN.

In operation, the circuits 110 and 120 control a power flow from the input port 105 to a battery 130 and to a primary load 140 applied at the priority port 119, or from the battery 130 to the primary load 140. The voltages at the various ports follow specific requirements. The voltage VHI at the priority output 119 is required to be maintained at a level equal to or greater than a predetermined value referred to as VHI_MIN. This requirement is prioritized over any power requirements at the port 117, including charging a depleted battery or maintaining a fully charged battery.

If an external source is connected at the input port 105, then the energy provided by the external source must be delivered to the priority port 119 to ensure that VHI does not fall below VHI_MIN. In heavy load condition, the charger may divert the energy provided at the input port away from the battery and redirect it to the priority port 119.

If the external source is not present, then energy is drawn from the battery to the priority port to maintain VHI≥VHI_MIN. This is achieved by operating the charger in a bypass mode or in a boost mode. If the battery voltage VBAT≥VHI_MIN then the charger is operated in the bypass mode in which the BYPASS FET is turned on fully resulting in the lowest ON-resistance state of the Bypass FET. Alternatively, if VBAT<VHI_MIN, then the charger is operated in the boost mode operation. In boost mode, the bypass FET is turned off, and the battery FET MBATFET is turned on.

The transistors M7, M8 and the inductor L3 operate as a boost converter to supply energy to the priority port VHI from the battery.

If the maximum available energy from the external source is insufficient to maintain VHI≥VHI_MIN, then energy may be drawn simultaneously from both the external source and the battery to ensure VHI≥VHI_MIN. This is achieved by turning on the transistors MBATFET and MBYPASS. For example, when VBAT≥VHI_MIN, then the battery can be used to supplement the priority port.

In summary, the relationship between the three port voltages is as follows:
  i) The voltage VIN provided at the input port may be greater or less than the voltage VMAIN or the voltage VHI.
  ii) VHI is required to be greater than or equal to VHI_MIN, always.
  iii) VMAIN may be greater or less than VHI_MIN.
  iv) VHI is maintained equal to VMAIN unless VMAIN is less than VHI_MIN.

Figure 2:
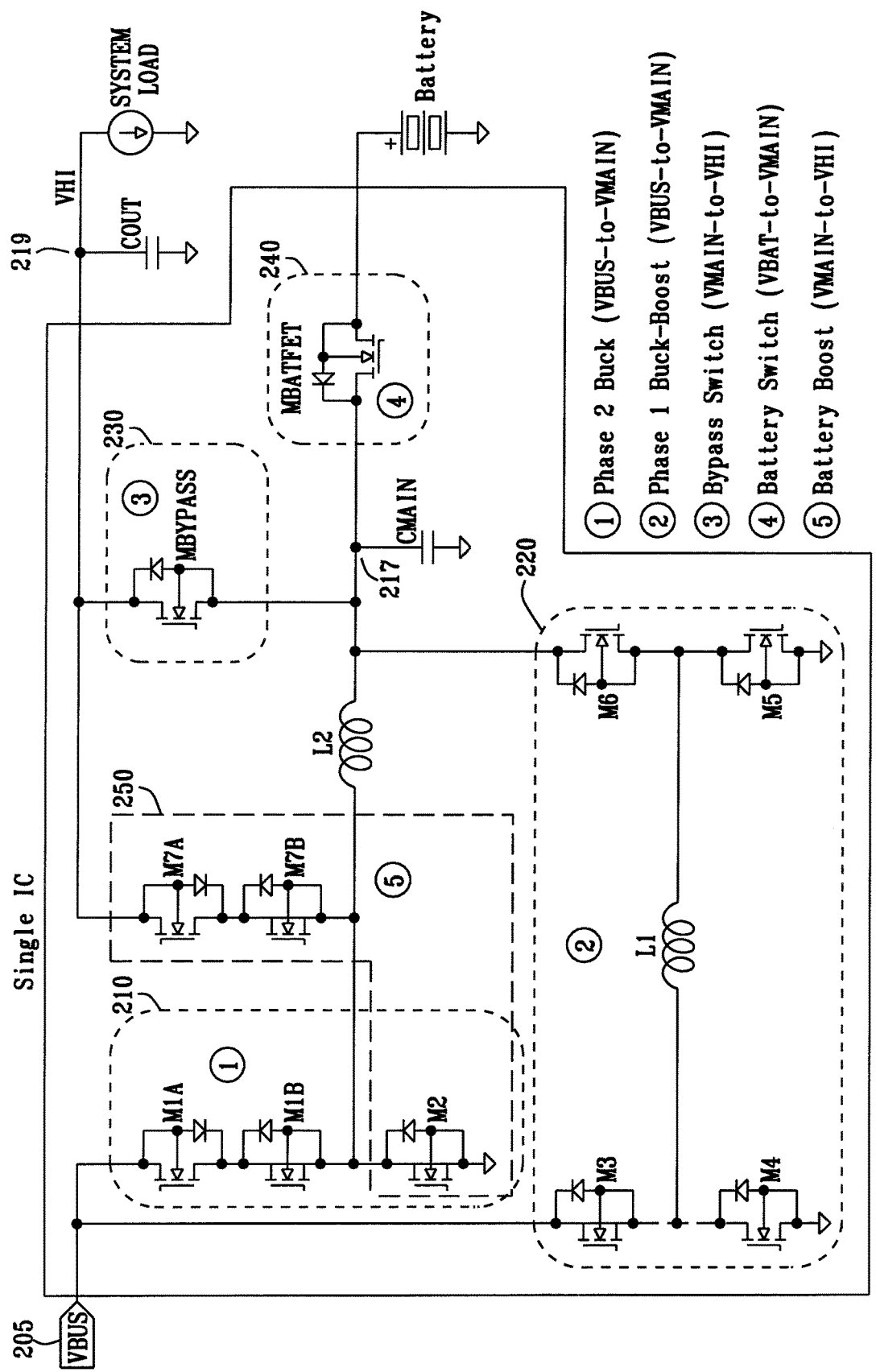
FIG. 2 is a diagram of another three-port battery charger according to the prior art.

FIG. 2 illustrates a more compact three-port battery charger. Compared with the charger 100 of FIG. 1, the charger 200 only requires two inductors instead of three. The charger 200 is provided with a buck circuit portion 210, a buck-boost circuit portion 220, a bypass switch 230 between the battery port 217 (VMAIN) and the priority port 219 (VHI), a battery switch 240 provided between the battery and the battery port, and a battery boost circuit portion 250.

The circuit 200 can be operated to provide the same charging functions as the charger 100. For instance, the buck-boost circuit portion 220 can supply the battery port 217 from the input port 205 while the battery boost circuit 250 supplies simultaneously a voltage to the priority port 219 from the battery port 217. If VBAT≥VHI_MIN, the buck 220 and buck-boost 210 circuit portions can be used to supply both the priority port and the battery. This requires the switches MBYPASS 230 and MBATFET 240 to be turned ON. However, when the battery boost circuit portion 250 is active the buck circuit portion 210 is inactive due to the shared low-side FET, M2. Although the circuit 200 can be implemented in a single chip, it still requires two inductors.

FIG. 3 is a diagram of a method for managing power in a power management circuit such as a charger according to the disclosure. At step 310, a switching converter circuit is provided. The switching converter has three terminals: a first terminal for receiving an input voltage, a second terminal for coupling to a battery and a third terminal for providing a voltage to a load. The switching converter includes a first set of switches coupled to the first terminal for; a second set of switches coupled to the second terminal, ; a bypass switch coupled between the second terminal and the third terminal; a single inductor provided between a first switching node of the first set of switches and a second switching node of the second set of switches; and a transition switch provided between the first switching node and the second or the third terminal.

The first terminal is an input terminal for receiving an input voltage from a voltage supply. The second terminal may be either an input terminal or an output terminal depending on whether the battery is used as source or as a load. The third terminal is an output terminal which may be used to provide a voltage to a system load such as the circuitry of a mobile device.

At step 320 a mode of operation is selected by changing a state of at least one of the bypass switch and the transition switch. The configuration of the switches forming the switching regulator can be changed to operate the switching regulator in various modes, for instance as a SISO buck, SIDO buck, DIDO buck or DIDO buck-boost. The proposed method is advantageous as it allows providing power to a system load using a single inductor.

Figure 4:
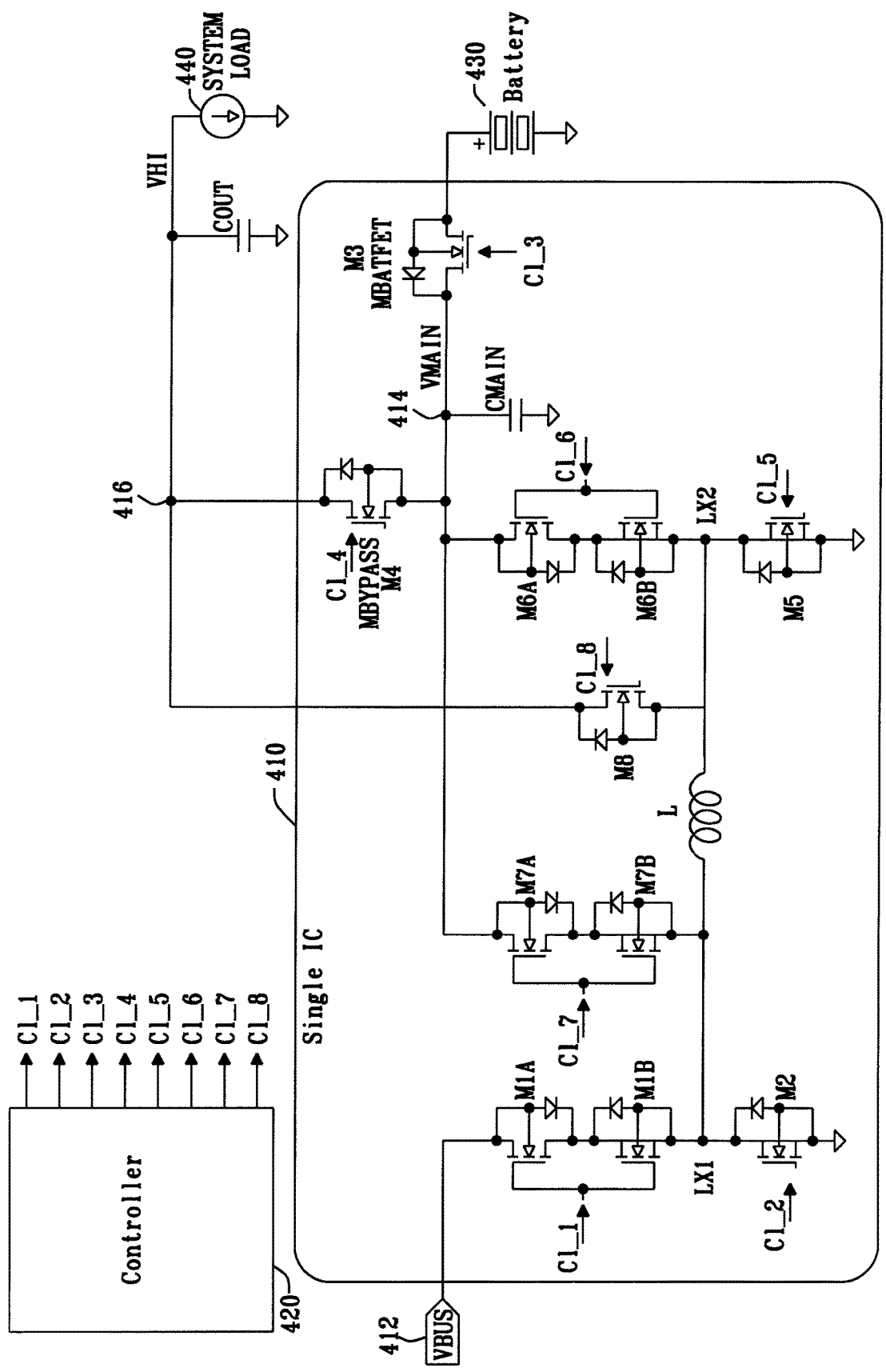
FIG. 4 is a diagram of a charger for implementing the method of FIG. 3.

FIG. 4 is a diagram of a three-port power management circuit, also referred to as charger for implementing the method of FIG. 3. The charger 400 includes a switching converter 410 coupled to a controller 420 for operating the switching converter in a plurality of regions or modes of operations.

The switching converter also referred to as regulator circuit 410 has three terminals or ports: a first port 412, a second port 414 and a third port 416. The first port 412 also referred to as input port is configured to receive a voltage from an external voltage supply not shown. The second port 414 also referred to as battery port is configured to either charge a battery 430 or for taking energy from it. The battery 430 may be the battery of a device external to the charger such as a mobile phone. The third port 416, also referred to as priority port is configured to provide a voltage VHI to a load 440. The load 440 may be a power management integrated circuit PMIC for managing the power of a processor of the external device.

The switching converter circuit 400 includes a first set of switches M1, M2 coupled to the input port 412 and a second set of switches M5, M6 coupled to the second port 414 and to the third port 416. The second set of switches is coupled to the third port 416 via a bypass switch MBYPASS (M4). The first set of switches is provided by a half bridge formed by the switch M1 provided between the input port 412 and a first switching node LX1, and the switch M2 provided between the first switching node LX1 and ground. Similarly, the second set of switches is provided by another half bridge formed by the switch M6 provided between the second port 414 and a second switching node LX2, and the switch M5 provided between the second switching node LX2 and ground. An inductor L is provided between the switching nodes LX1 and LX2. The bypass switch MBYPASS (M4) is coupled between the second port 414 and the third port 416. A transition switch M7 is provided between the first switching node LX1 and the second port 414. A switch M8 is provided between the second switching node LX2 and the third port 416. A battery switch MBATFET (M3) may be provided between the second port 414 and the battery 430.

In this exemplary embodiment the switch M1 is provided by two transistors M1A and M1B connected in a back to back configuration. For instance, M1A and M1B may be N-type MOSFETs. The drain of the first transistor M1A is connected to the drain of the second transistor M1B such that the body diode of transistor M1A is facing the body diode of the transistor M1B. Using two switches in a back to back configuration prevents a current from passing to the input port while the switch M1 is open. This prevents damaging the port especially in high voltage applications. Similarly the switch M6 is provided by two transistors M6A and M6B connected in a back to back configuration, and the switch M7 is also provided by two transistors M7A and M7B connected in a back to back configuration. The transistors M6A, M6B, M7A and M7B may also be implemented as N-type MOSFETs.

The controller 420 is adapted to generate a plurality of control signals for controlling the switches of the switching converter 410. Eight controls signals are provided, labelled Cl_1 to Cl_8, to control the switches M1 to M8 respectively. The controller 420 includes a ramp generator (not shown) configured to provide a plurality of ramp signals and to compare one or more ramp signals with a reference to transition between different modes of operation.

In operation, the controller 420 is configured to select a region or mode of operation based on the values of the voltages VIN, VHI and VMAIN provided at the first, second and third ports respectively. When VHI=VMAIN, the controller 420 may operate the regulator circuit 410 as a single input single output SISO buck-boost converter, referred to as first mode. When VHI≥VMAIN, the controller 420 may operate the regulator circuit 410 as a single input dual output SIDO buck converter, referred to as second mode. When VHI>VMAIN, the controller 420 may operates the regulator circuit 410 either as a dual input dual output DIDO buck converter referred to as third mode, or as a DIDO buck-boost converter, referred to as fourth mode.

Figure 5A:
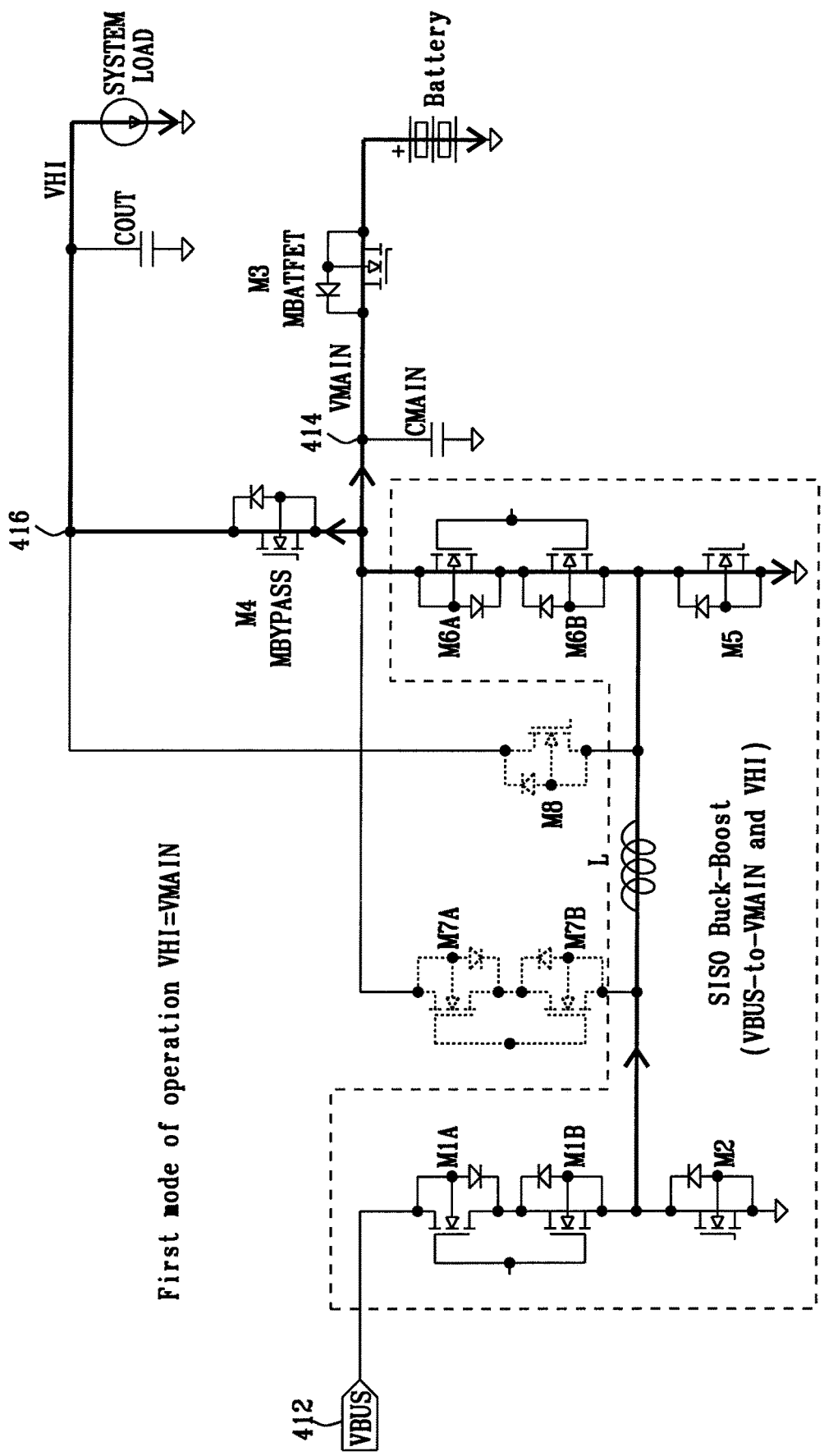
FIG. 5A is a diagram illustrating the operation of the charger of FIG. 4 as a single input single output SISO buck-boost converter.

FIG. 5A is a diagram illustrating the operation of the charger of FIG. 4 in the first mode. In the first mode the regulator circuit is configured as a single input single output buck-boost converter. The first port 412 received the voltage VIN, and the second and third ports 414 and 416 have the same voltage VMAIN=VHI. The switches M7 and M8 are turned off (open) while the switches M3 and M4 are turned on (closed). The switches M1, M2, M5 and M6 are operated to magnetize and demagnetize the inductor L to distribute energy from the input port 412 to both the second and third ports 414 and 416, respectively.

In the first mode of operation VMAIN≥VHI_MIN and the controller forces VMAIN and VHI to be equal by turning on the bypass switch M4. The regulator can work as buck or boost converter depending on the level of VIN. If VIN>VMAIN=VHI the regulator operates as a buck converter. However, if VIN<VMAIN=VHI, then the regulator operates as a boost converter.

Figure 5B:
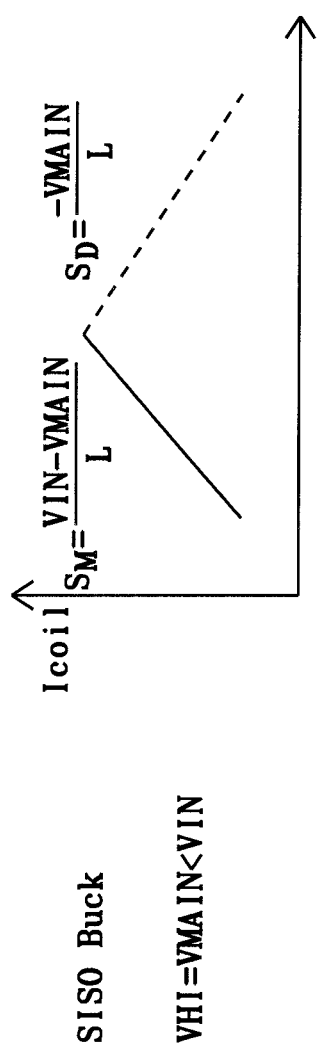
FIG. 5B is a time chart of the inductor current when the regulator of FIG. 4 operates as a SISO buck converter.

FIG. 5B shows the variation of the inductor current when the regulator operates as a SISO buck converter. The inductor L is first magnetized using a path formed by M1, L, M6 and then demagnetized using a path formed by M2, L, M6. The inductor current increases during the magnetization period with a slope SM=(VIN−VMAIN/L), and decreases during the de-magnetization period with a slope SD= −VMAIN/L.

Figure 5C:
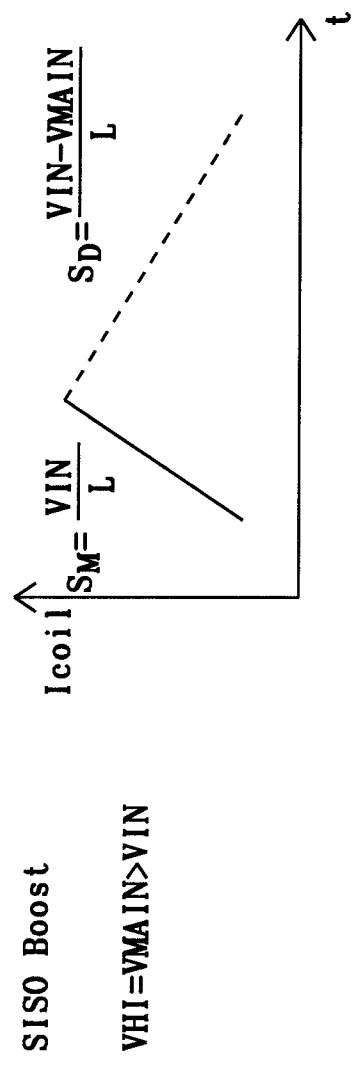
FIG. 5C is a time chart of the inductor current when the regulator of FIG. 4 operates as a SISO boost converter.

FIG. 5C shows the variation of the inductor current when the regulator operates as a SISO boost converter. The inductor L is first magnetized using a path formed by M1, L, M5 (M2 and M6 are turned off) and then demagnetized using a path formed by M1, L, M6 (M2 and M5 are turned off). The inductor current increases during the magnetization period with a slope SM=(VIN/L), and decreases during the de-magnetization period with a slope SD=(VIN−VMAIN)/L.

Figure 6A:
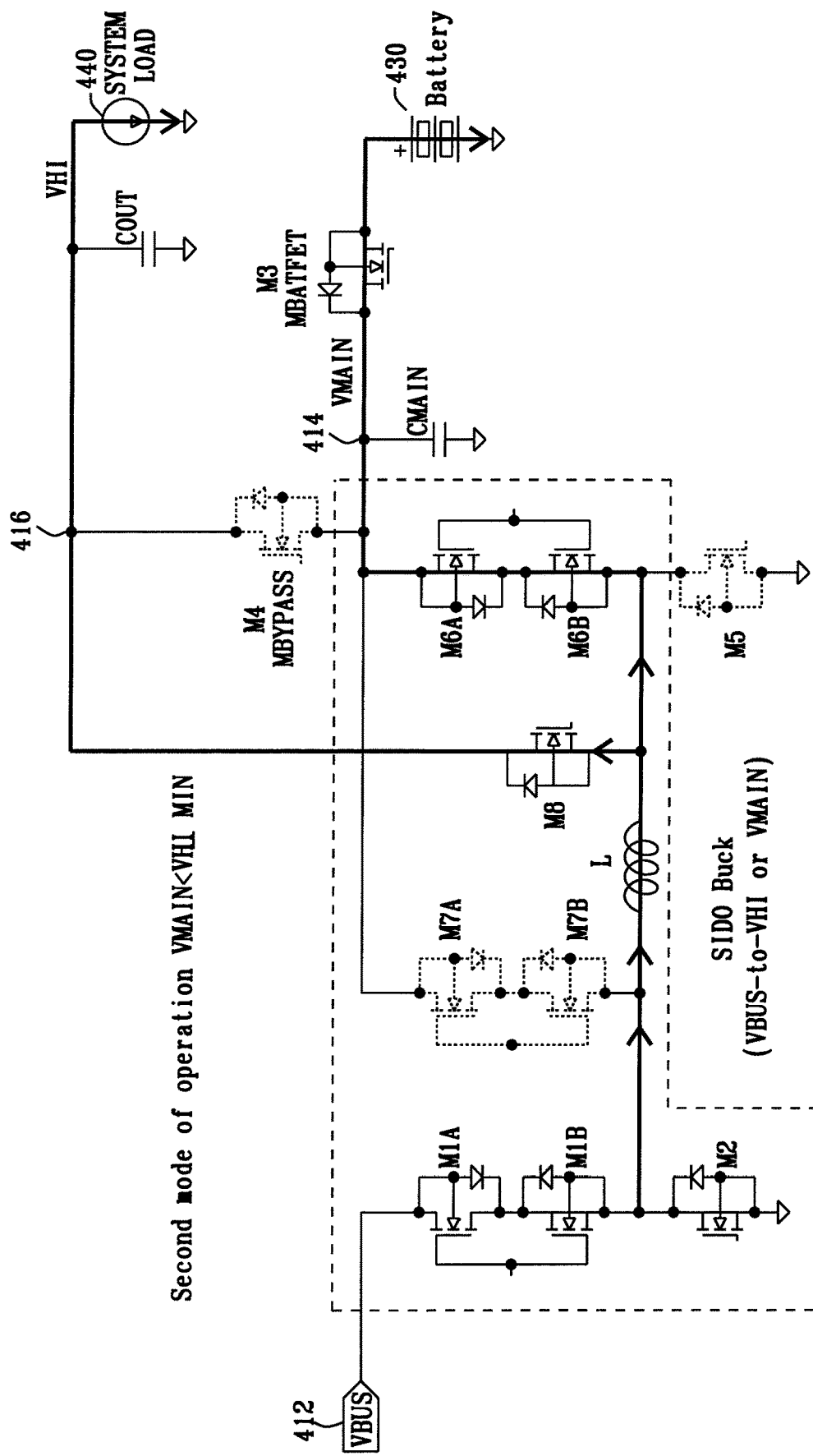
FIG. 6A is a diagram illustrating the operation of the charger of FIG. 4 as a single input dual output SIDO buck converter.

FIG. 6A is a diagram illustrating the operation of the charger of FIG. 4 in the second mode. In the second mode of operation, VMAIN<VHI_MIN. The controller turns the bypass switch M4 off, hence creating two independent outputs 414 and 416. In this case, the system operates as a single input (VIN) dual output (VHI & VMAIN) buck. The switches M5, M7 and M4 are turned off (open) while the switch M3 is turned on (closed). The switches M1, M2, M6 and M8 are operated to magnetize and demagnetize the inductor L to distribute energy from the input port 412 to both the second and third ports 414 and 416, respectively. The control scheme directs the inductor current during the demagnetization interval between the two outputs. The controller prioritizes delivering power to the third port 416 (VHI) over the second port 414 (VMAIN).

Figure 6B:
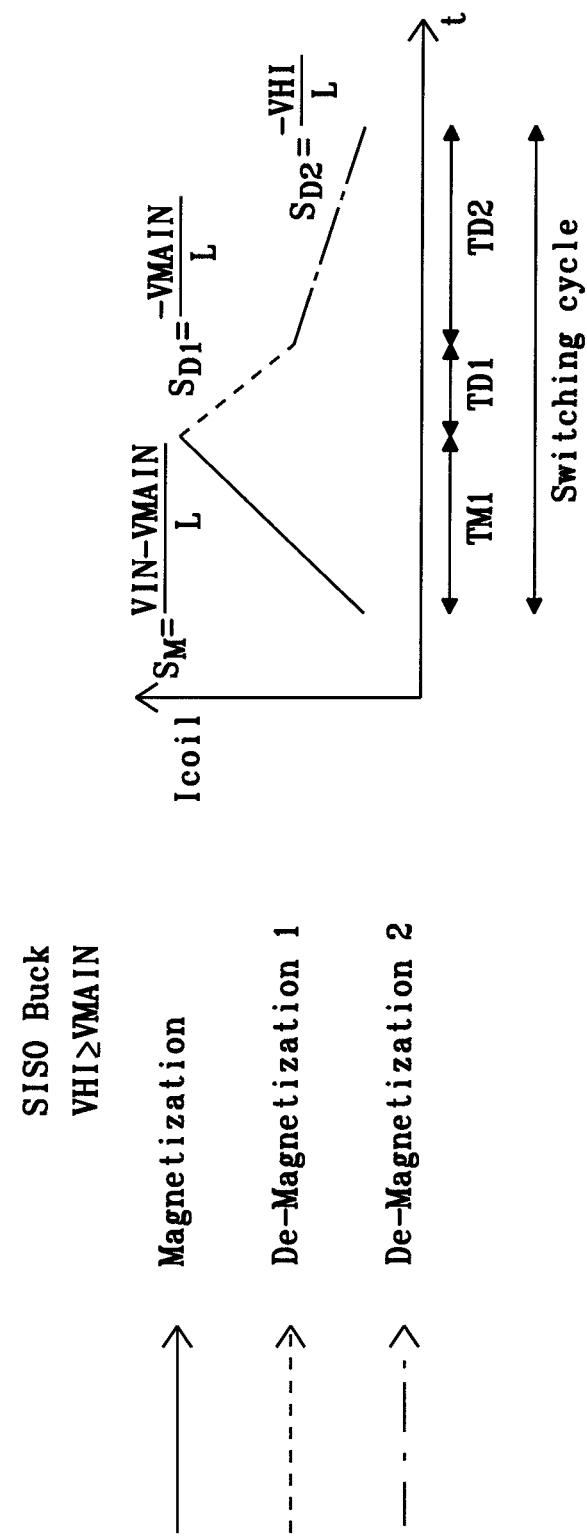
FIG. 6B is a time chart of the inductor current when the regulator of FIG. 4 operates as a SIDO buck converter.

FIG. 6B shows the variation of the inductor current during a switching cycle when the regulator operates as a SIDO buck converter. At the beginning of the cycle the inductor current has an initial value IL0. The inductor current then varies during the switching cycle before returning to the initial value IL0 at the end of the switching cycle. During a first period TM1 the inductor L is magnetized using a path formed by M1, L, M6 (M2, M5 and M8 are turned off). The inductor current increases during the magnetization period with a slope SM=(VIN−VMAIN)/L. During a second period TD1 the inductor is then demagnetized using a first demagnetization path formed by M2, L, M6 (M1, M5 and M8 are turned off). The inductor current decreases with a slope SD1=−VMAIN/L. During a third period TD2 the inductor is demagnetized using a second demagnetization path formed by M2, L, M8 (M1, M5 and M6 are turned off). The inductor current decreases with a slope SD2=−VH1/L. The controller adjusts the inductor magnetization time TM1 to satisfy the energy requirements for the second port 414 (VMAIN). The controller also adjusts the relative durations of demagnetization TD1 and TD2 to satisfy the energy requirements for the third port 416 (VHI).

Figure 7A:
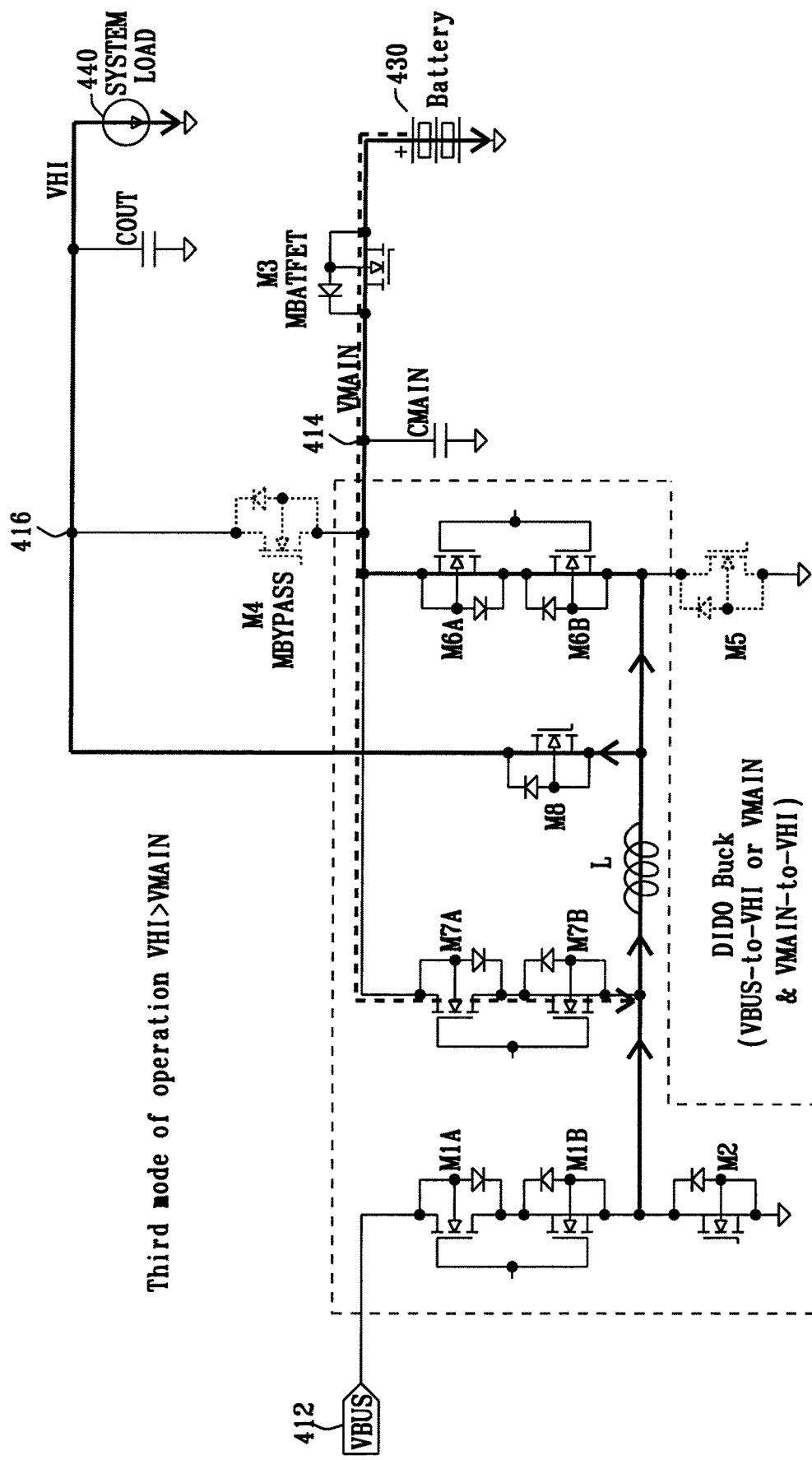
FIG. 7A is a diagram illustrating the operation of the charger of FIG. 4 as a dual input dual output DIDO buck converter.

FIG. 7A is a diagram illustrating the operation of the charger of FIG. 4 in a third mode. In the third mode the regulator circuit is configured as a dual input dual output DIDO buck converter. The first port 412 receives the voltage VIN, the second port 414 has a voltage VMAIN and the third port 416 has a voltage VHI>VMAIN. The switches M4 and M5 are turned off (open) while the switch M3 is turned on (closed). The switches M1, M2, M6, M7 and M8 are operated to magnetize and demagnetize the inductor L to distribute energy from the input port 412 to both the second and third ports 414 and 416, respectively.

Figure 7B:
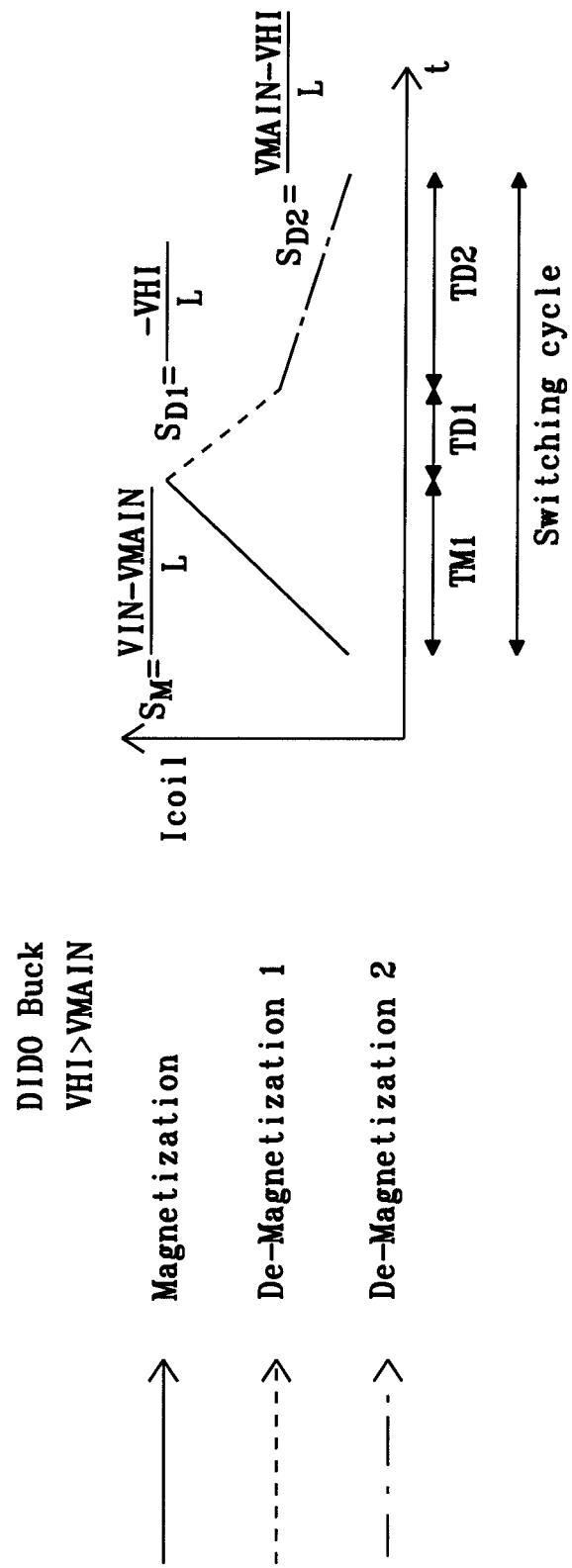
FIG. 7B is a time chart of the inductor current when the regulator of FIG. 4 operates as a DIDO buck converter.

FIG. 7B shows the variation of the inductor current during a switching cycle when the regulator operates as a DIDO buck converter. During a first period TM1 the inductor L is magnetized using a path formed by M1, L, M6 (M2, M5 and M8 are turned off). The inductor current increases with a slope SM=(VIN−VMAIN)/L. Energy is supplied from the first port 412 to the second port 414. During a second period TD1 the inductor is demagnetized using a first demagnetization path formed by M2, L, M8 (M1, M5, M6 and M7 are turned off). The inductor current decreases with a slope SD1=−VHI/L. The energy stored in the inductor is supplied to the third port 416. During a third period TD2 the inductor is demagnetized using another demagnetization path formed by M7, L, M8 (M1, M2, M5 and M6 are turned off). The inductor current decreases with a slope SD2=(VMAIN−VHI)/L. Energy is supplied from the battery to the third port 416.

Figure 8A:
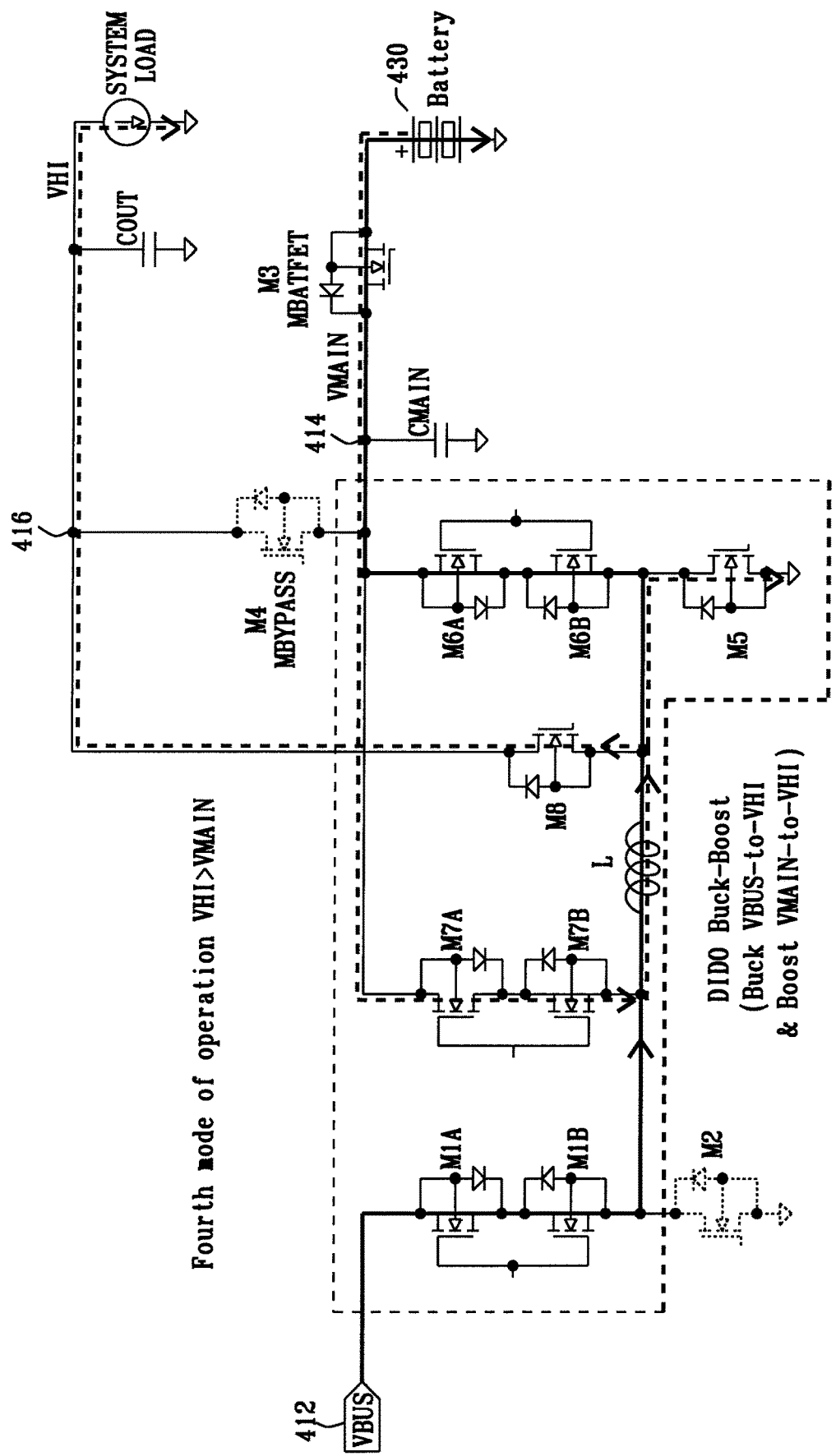
FIG. 8A is a diagram illustrating the operation of the charger of FIG. 4 as a DIDO buck-boost converter.

FIG. 8A is a diagram illustrating the operation of the charger of FIG. 4 in a fourth mode. In the fourth mode the regulator circuit is configured as a DIDO buck-boost converter. The first port 412 received the voltage VIN, the second port 414 has a voltage VMAIN and the third port 416 has a voltage VHI>VMAIN. The switches M2 and M4 are turned off (open) while the switch M3 is turned on (closed). The switches M1, M5, M6, M7 and M8 are operated to magnetize and demagnetize the inductor L to distribute energy from the input port 412 to both the second and third ports 414 and 416, respectively.

Figure 8B:
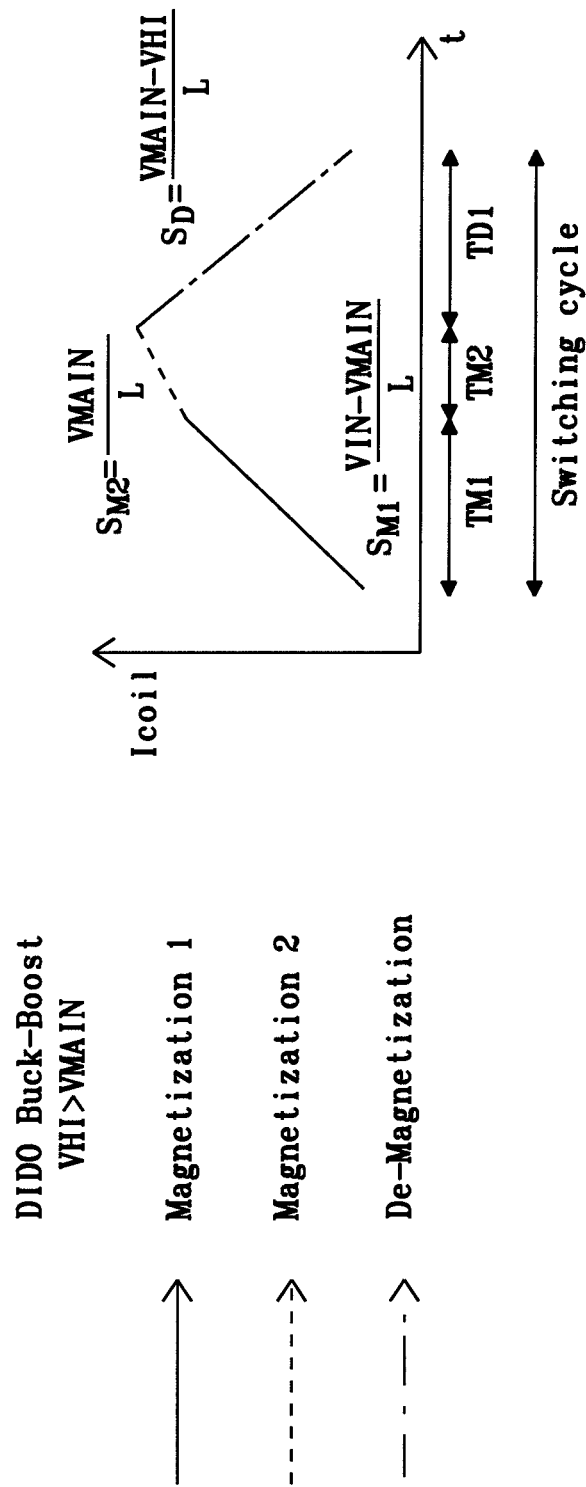
FIG. 8B is a time chart of the inductor current when the regulator of FIG. 4 operates as a DIDO buck-boost converter.

FIG. 8B shows the variation of the inductor current during a switching cycle when the regulator operates as a DIDO buck-boost converter. During a first period TM1 the inductor L is magnetized using a magnetization path formed by M1, L, M6 (M2, M5, M7 and M8 are turned off). The inductor current increases with a slope SM1=(VIN−VMAIN)/L. Energy is supplied from the first port 412 to the second port 414. During a second period TM2 the inductor is magnetized using another magnetization path formed by M7, L, M5 (M1, M2, M6 and M8 are turned off). Energy is supply from the battery to further magnetize the inductor. The inductor current increases with a slope SM2=VMAIN/L. During a third period TD1 the inductor is demagnetized using a demagnetization path formed by M7, L, M8 (M1, M2, M5 and M6 are turned off). The inductor current decreases with a slope SD=(VMAIN−VHI)/L. Energy is supplied from the second port 414 to the third port 416. So in summary, the energy from the input port 412 is first transferred to the battery, then transferred from the battery back to the inductor and eventually to the third port 416.

Figure 9:
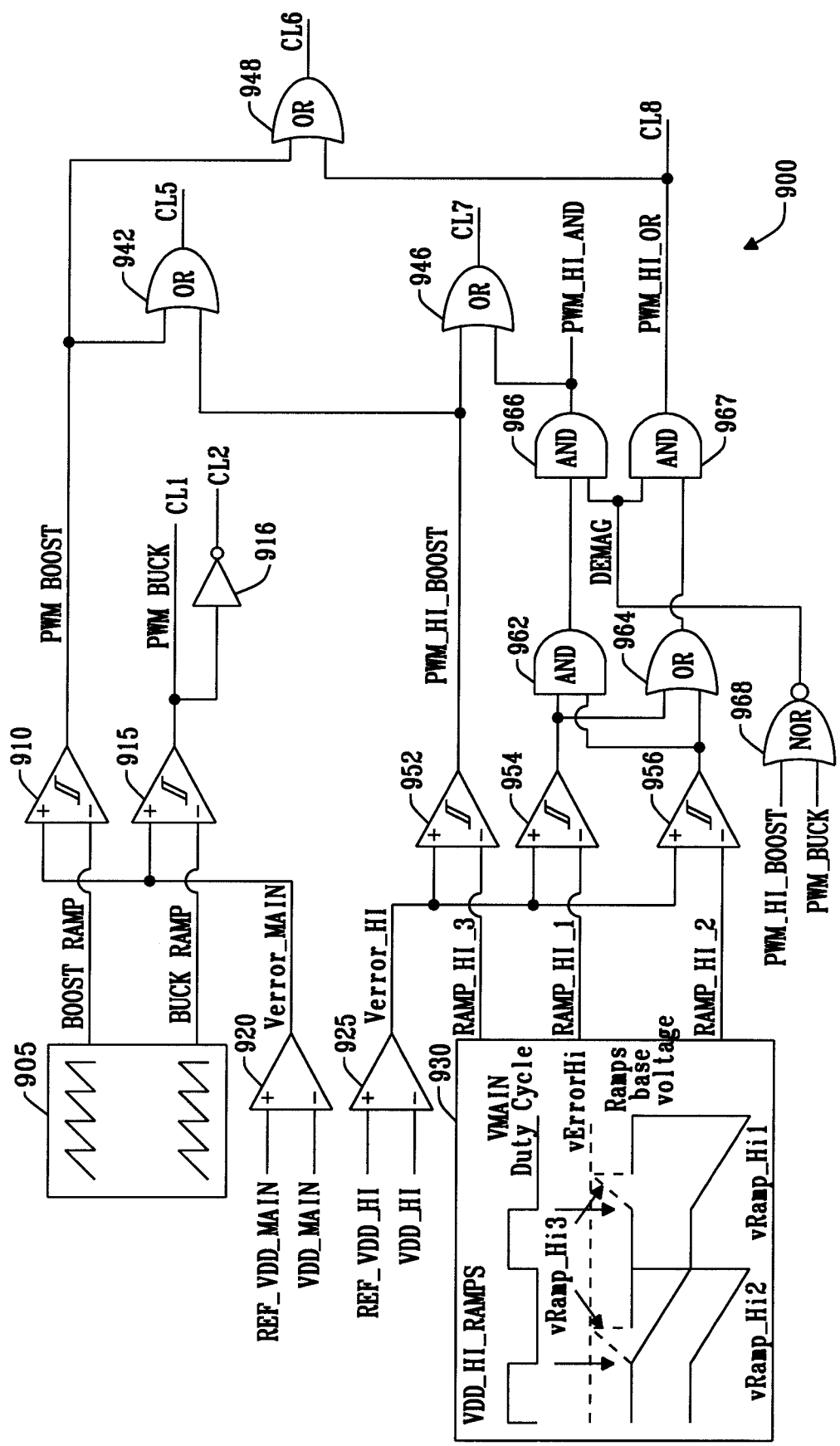
FIG. 9 is a diagram of a controller for operating the circuit of FIG. 4.

FIG. 9 is a diagram of an exemplary controller for operating the circuit of FIG. 4. The controller 900 includes a first ramp generator 905 for generating a two ramp signals referred to as boost ramp and buck ramp and a second ramp comparator 930 for generating the ramp signals Vramp_Hi1, Vramp_Hi2, and Vramp_Hi3. The controller 900 is also provided with first and second differential amplifiers 920 and 925 and five comparators labelled 910, 915, 952, 954 and 956.

The first differential amplifier 920 has a first input, for receiving a reference voltage REF_VDD_Main, a second input for receiving a voltage VDD_Main and an output for providing an error signal Verror_Main. The second differential amplifier 925 has a first input for receiving a reference voltage REF_VDD_HI, a second input for receiving a voltage VDD_HI and an output for providing an error signal Verror_HI.

The first comparator 910 has a first input for receiving the error voltage Verror_Main, a second input for receiving the ramp signal Boost ramp, and an output for providing a PWM signal PWM Boost. The second comparator 915 has a first input for receiving the error voltage Verror_Main, a second input for receiving the ramp signal Buck ramp, and an output for providing a PWM signal PWM Buck corresponding to control signal CL1. An inverter 916 is provided for inverting PWM Buck to obtain control signal CL2. The third comparator 952 has a first input for receiving the error voltage Verror_HI, a second input for receiving the ramp signal Vramp_HI3, and an output for providing a PWM signal PWM_HI_Boost. An OR logic gate 942 is provided to generate control signal CL5 based on PWM signals PWM Boost and PWM_HI_Boost provided at its inputs. The fourth comparator 954 has a first input for receiving the error voltage Verror_HI, a second input for receiving the ramp signal Vramp_HI1, and an output coupled to a first input of AND gate 962, and to a first input of OR gate 964. The fifth comparator 956 has a first input for receiving the error voltage Verror_HI, a second input for receiving the ramp signal Vramp_HI2, and an output coupled to a second input of AND gate 962, and to a second input of OR gate 964.

A NOR logic gate 968 is provided to generate a demagnetisation signal DEMAG based on the signals PWM_HI_Boost and PWM_Buck. The DEMAG signal is received by AND gates 966 and 967 to generate PWM signals PWM_HI_AND based on the output of AND 962 and PWM_HI_OR based on the output of OR gate 964, respectively. The PWM_HI_OR signal corresponds to CL8. Another OR logic gate 946 is provided to generate control signal CL7 based on PWM signals PWM_HI_Boost and PWM_HI_AND provided at its inputs. Another OR logic gate 948 is provided to generate control signal CL6 based on PWM signals PWM_Boost and PWM_HI_OR provided at its inputs.

The control signals CL3 and CL4 for controlling the switches M3 and M4 may be generated using conventional techniques, used for instance in conventional chargers.

Figure 10A:
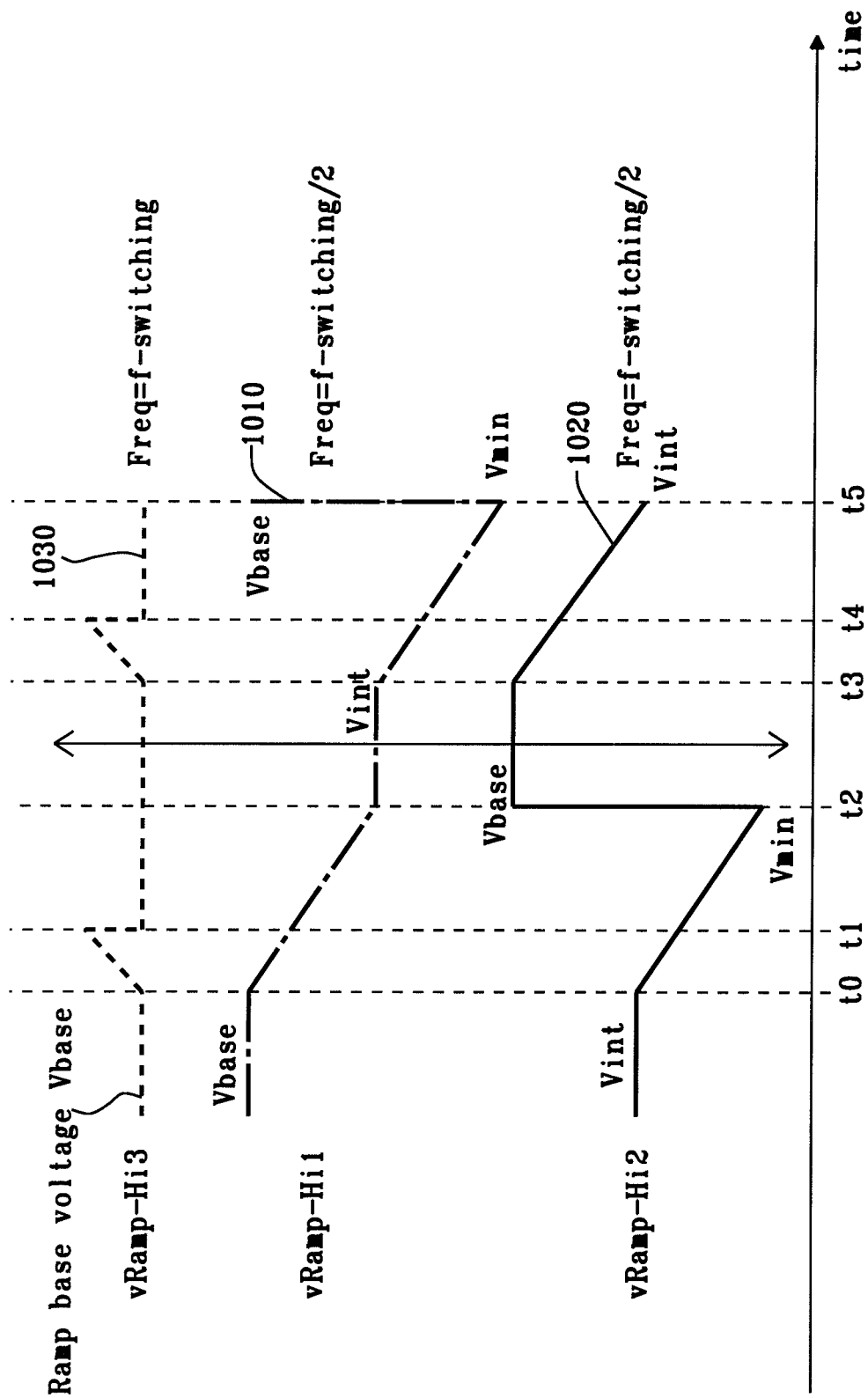
FIG. 10A is an exploded representation showing the profiles of three ramp signals generated by the ramp generator of the controller of FIG. 9.

FIG. 10A is a waveform diagram showing the profiles of three ramp signals 1010, 1020 and 1030 generated by the ramp generator 930 of the controller of FIG. 9. For clarity the ramp signals are shifted along the amplitude axis.

The first signal 1010 referred to as Vramp-Hi1 is a ramp down signal. Before time t0 the signal 1010 is at a base voltage Vbase also referred to as or pedestal voltage. Between the times t0 and t2, the ramp signal decreases linearly down to intermediate voltage Vint, then remains constant between t2 and t3. Between the times t3 and t5 the ramp signal decreases linearly down to a minimum threshold level Vmin before returning to Vbase at time t5.

The second signal 1020 is referred to as Vramp-Hi2. Vramp-Hi2 has the same profile than Vramp-Hi1 but phase shifted by 180°. Before t0, the ramp signal 1020 is at the intermediate level Vint (between Vmin and Vbase). Between the times to and t2 Vramp-Hi2 decreases linearly down to Vmin. At time t2 Vramp-Hi2 increases instantly to Vbase and remains constant between the times t2 and t3. The ramp signal 1020 then decreases linearly to reach its original value Vint at time t5.

The third signal 1030 referred to as Vramp-Hi3 is a triangular ramp up signal. Before time t0 the signal level is at the base voltage Vbase. Between the times t0 and t1 the signal 1030 increases linearly and returns to Vbase at time t1. Between the times t1 and t3 Vramp-Hi3 remains at Vbase. Then the signal ramps up again between the times t3 and t4.

The amplitudes of the ramp signals 1010, 1020 and 1030 may vary depending on operating requirements. The minimum voltage Vmin is determined by Vint minus the height of Vramp-Hi2. The intermediate pedestal voltage Vint is equal to Vbase minus the height of Vramp_Hi1. The intermediate voltage Vint may be equal to Vmin+(Vbase−Vmin)/2. For example Vbase, Vint and Vmin may have the following values of 2V, 1.5V and 1V, respectively.

Figure 10B:
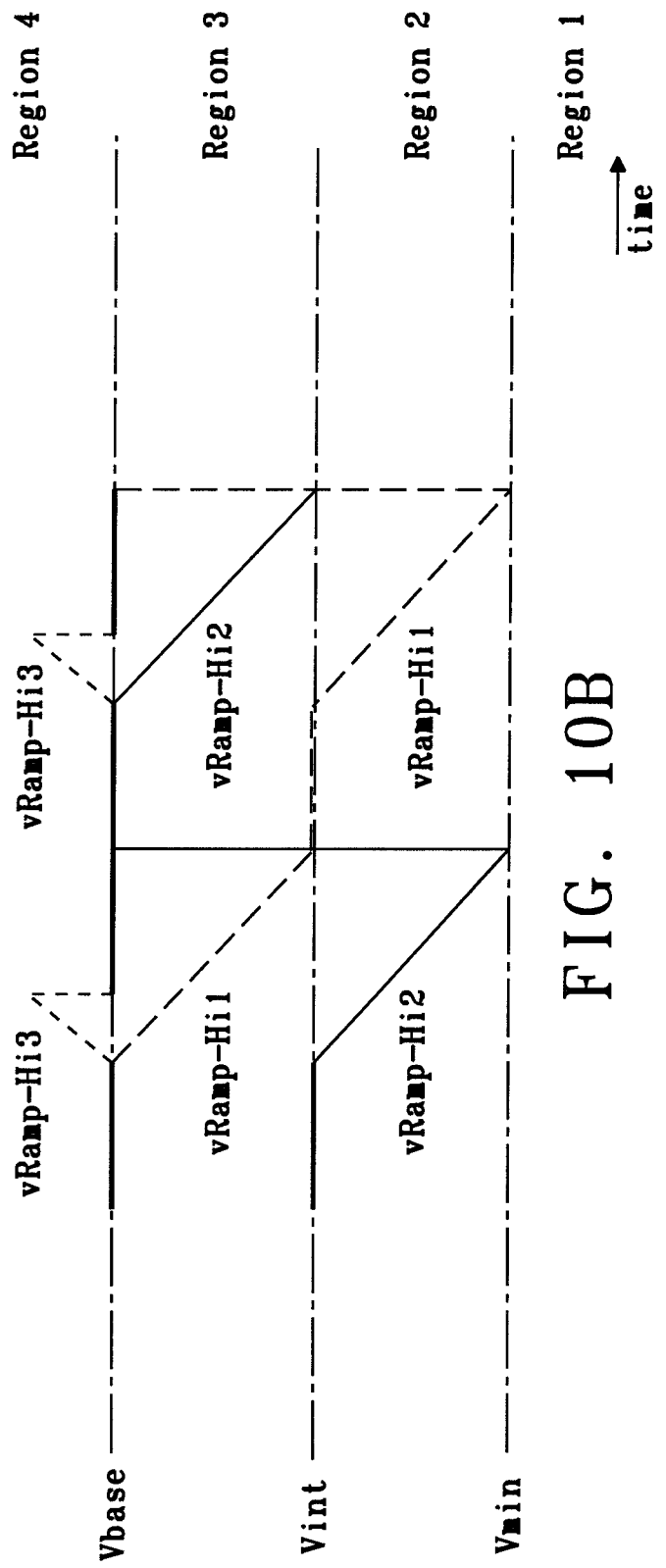
FIG. 10B is a representation of the ramp signals Vramp-Hi1, Vramp-Hi2 and Vramp-Hi3 as generated by the ramp generator of FIG. 9.

FIG. 10B shows the ramp signals Vramp-Hi1, Vramp-Hi2 and Vramp-Hi3 superimposed, as generated by the ramp generator 930 of FIG. 9.

FIG. 11(A,B,C,D) shows the generation of the ramp signal voltages when the regulator circuit is operated in region 1 (mode1), region 2 (mode2), region 3 (mode3) and region 4 (mode4), respectively. The controller of FIG. 9 generates an error signal Verror_Hi that is a function of the difference between the reference voltage VHI_MIN (shown in FIG. 9 as REF_VDD_HI) and a feedback signal VHI_fbk (shown in FIG. 9 as VDD_HI). The error signal Verror_Hi becomes active only when VHI drops below VHI_MIN.

When the error voltage Verror_Hi is below the minimum ramp voltage Vmin, the regulator is operated in the first mode (region 1). In the first mode, the switch states are controlled by a ramp signal Vramp_Lo and an error signal Verror_Lo (not shown). The ramp signals Vramp-Hi1 and Vramp-Hi2 are not required to regulate Vmain and may be held in a static state.

When the error voltage Verror_Hi is between Vmin and the intermediate voltage Vint, the regulator is operated in the second mode (region 2). The ramp generator generates the ramp signals Vramp-Hi1 and Vramp-Hi2. During the duty cycle of VMAIN which corresponds to the on-time of CL1 and CL6 (magnetization period TM1), the ramp signals remain at a constant value Vbase or Vint.

When the error voltage Verror_Hi is between Vint and Vbase, the regulator is operated in the third mode (region 3). The ramp generator generates the ramp signals Vramp-Hi1 and Vramp-Hi2.

When the error voltage Verror_Hi is above Vbase, the regulator is operated in the fourth mode (region 4). The ramp generator generates the ramp signals Vramp-Hi1, Vramp-Hi2 and Vramp-Hi3. The ramp voltage Vramp-Hi3 is generated at the end (falling edge) of the duty cycle pulse of VMAIN.

When operated in the fourth mode, the transfer of energy from the first port 412 to the third port 416 is performed in a two steps process which dissipate significant energy. Moreover, if VIN<VMAIN<VHI_MIN, then the charger 400 would fail to maintain VHI≥VHI_MIN. To address these limitations an alternative control scheme is presented with reference to FIGS. 13-18 below.

Figure 12A:
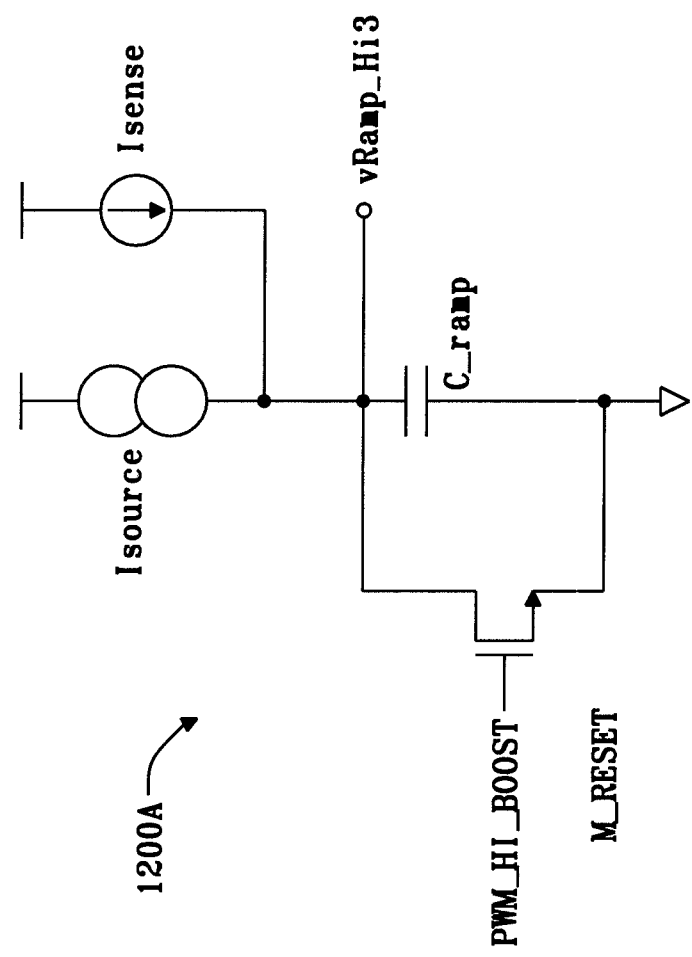
FIG. 12A is a ramp generator circuit for generating the ramp Vramp-Hi3.

FIG. 12A is an exemplary circuit for generating the ramp signal Vramp_Hi3. The circuit 1200A includes a current source Isource coupled in series with a ramp capacitor Cramp. A reset switch Mreset is coupled in parallel with the ramp capacitor for discharging it. Optionally, a current sensor Isense may be provided to sense the current provided by the current source. In operation the reset switch may be activated using the PWM signal PWM_HI_Boost described in FIG. 9 above.

Figure 12B:
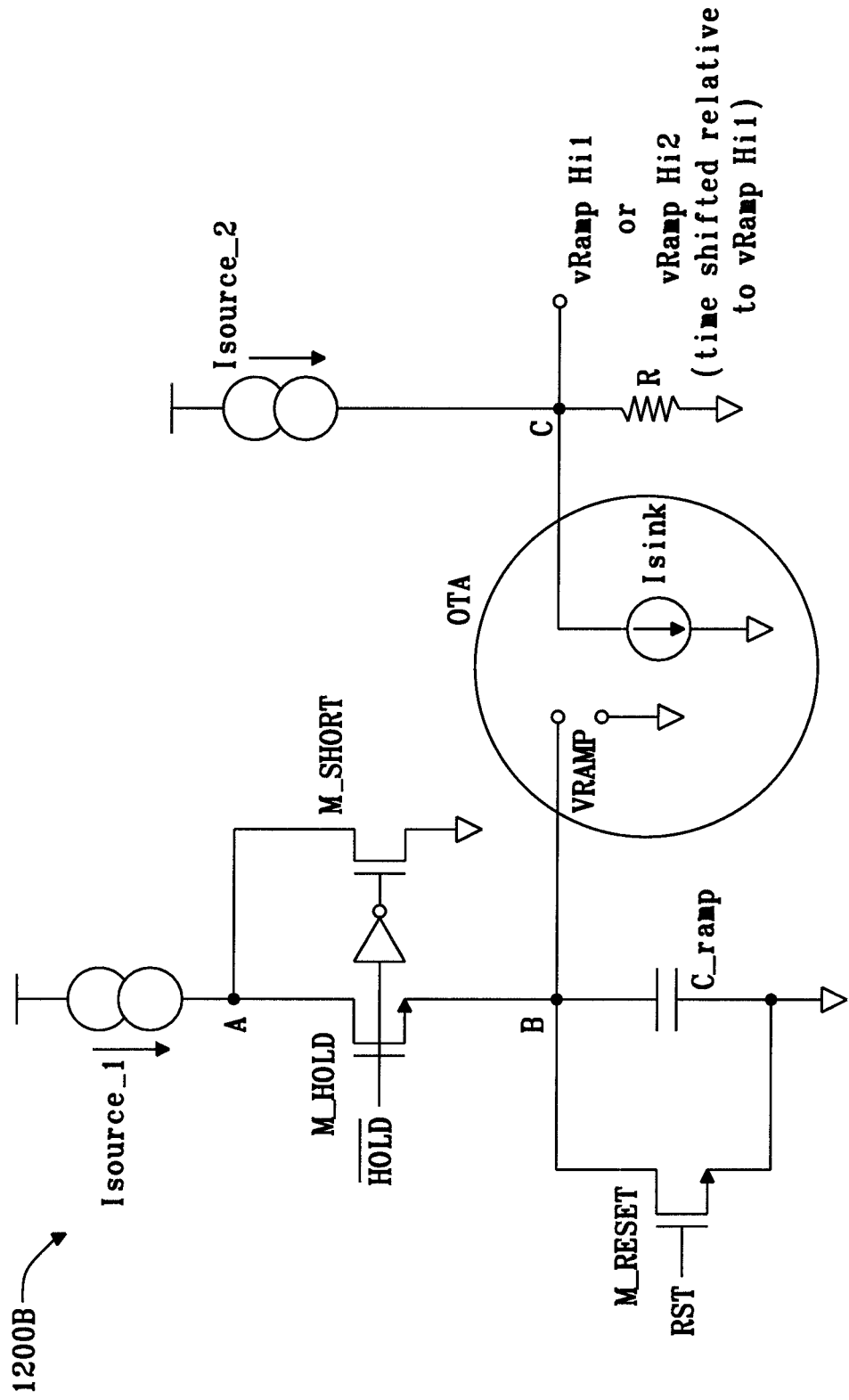
FIG. 12B is a ramp generator for generating the ramp Vramp-Hi1 or Vramp-Hi2.

FIG. 12B is an exemplary circuit for generating the ramp signal Vramp_Hi1 or Vramp_Hi2. The circuit 1200B includes a first current source Isource1 coupled in series with a ramp capacitor Cramp via a hold switch M_Hold. The switch M_Hold has a first terminal connected to Isource_1 at node A and a second terminal coupled to Cramp at node B. A reset switch Mreset is coupled in parallel with the ramp capacitor between node B and ground. Another switch M_short is provided between node A and ground for shorting the first current source Isource1. A second current source Isource2 is coupled in series with a resistor R, at node C. A voltage controlled current source/sink such as an operational transconductance amplifier OTA, is provided between node B and node C.

Figure 12C:
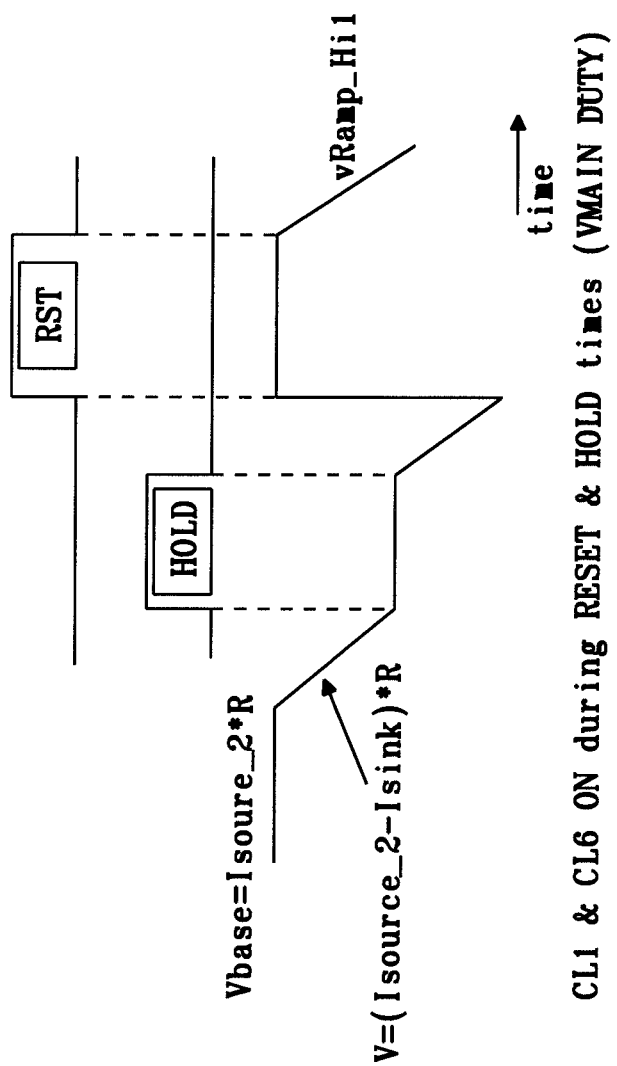
FIG. 12C is a diagram illustrating the operation of the ramp generator of FIG. 12B.

FIG. 12C illustrates the operation of the circuit 1200B. In operation the hold switch M_Hold receives a control signal. The control signal may be the inverse of the signal VMAIN Duty cycle received at the second port 414 of the converter. The hold and reset pulses have an on-time duration equal to the inductor magnetization time TM1. When M_hold is on (closed) M_short is off (open) and Cramp charges. When M_hold is off, M_short is on and no current is provided to Cramp. The voltage Vramp at node B controls a current Isink between node C and ground such that Isink=Vramp*Gm, in which Gm is the transconductance of the OTA. This control the voltage at node C which provides Vramp_Hi1 or Vramp_Hi2.

Figure 13:
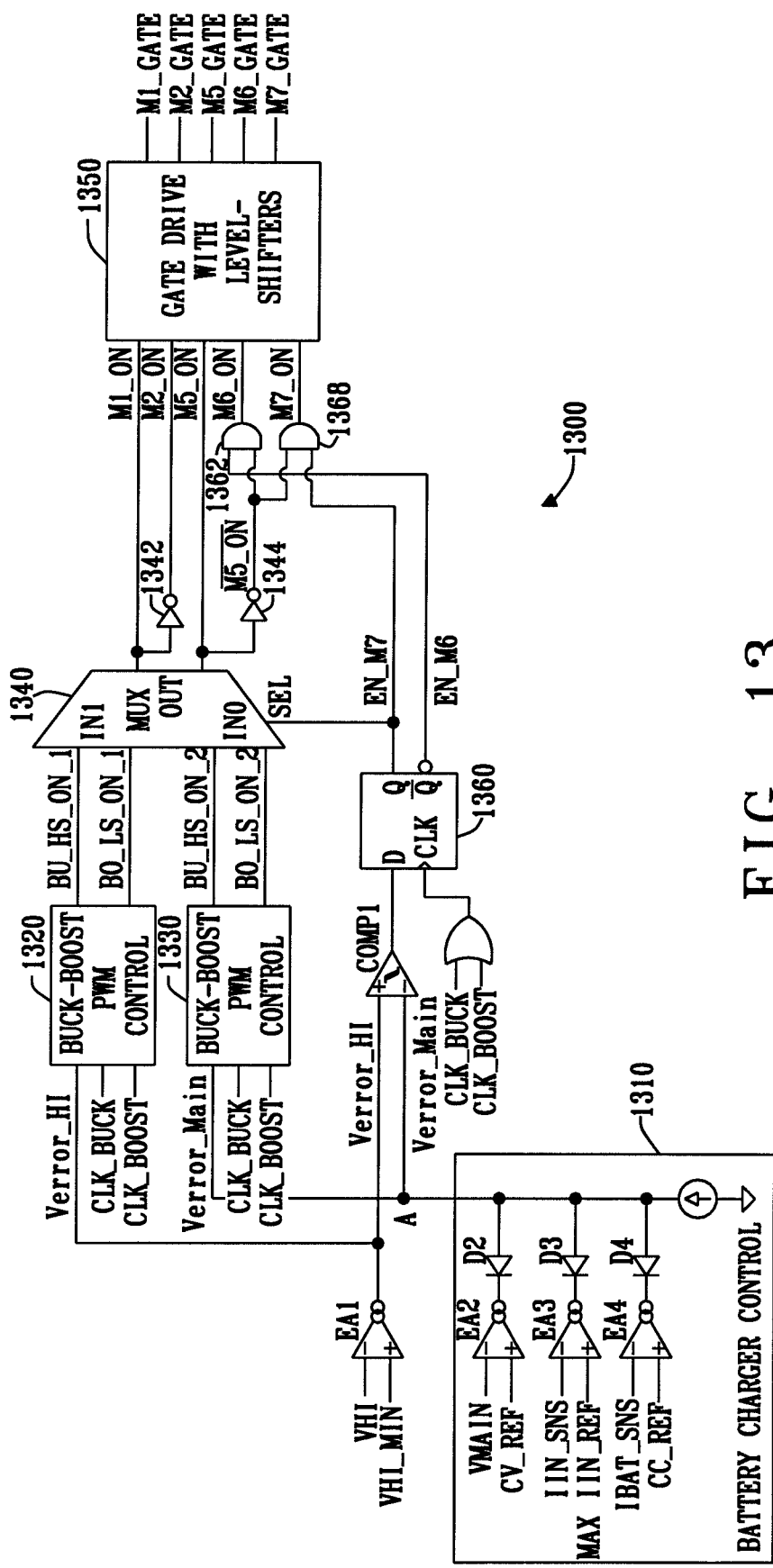
FIG. 13 is a diagram of another control circuit for operating the regulator circuit of FIG. 4 as a SIDO buck-boost converter.

FIG. 13 shows a diagram of a control circuit for operating the regulator circuit as a SIDO buck-boost converter. The controller 1300 includes a battery charger controller 1310, first and second PWM controllers 1320 and 1330, a multiplexer 1340, a driver 1350 and a memory device 1360.

A first error amplifier such as a differential amplifier EA1, is provided to compare the voltage VHI at the third port 416 with a reference voltage VHI_MIN to produce an error signal, Verror_HI. The battery charger controller 1310 includes three error amplifiers, EA2, EA3 and EA4. The output of each error amplifier EA2, EA3, EA4 is coupled to the output of the battery charger at node A via a corresponding diode D2, D3 and D4, respectively. For instance, the output of EA2 is coupled to node A via diode D2.

The differential amplifier EA2 is provided to compare the voltage VMAIN (battery termination voltage) at the second port 414 with a reference voltage CV_REF to produce an error signal, EA_error2. The differential amplifier EA3 is provided to compare the input current IIN_SNS provided at the first port 412 with a maximum input current MAX_I-IN_REF to produce an error signal, EA_error3. The differential amplifier EA4 is provided to compare the battery charging current IBAT_SNS with a reference current CC_REF to produce an error signal, EA_error4.

A comparator COMP1 has a first input for instance a non-inverting input coupled to the output of the first differential amplifier EA1, and a second input for instance an inverting input coupled to the output of the battery charger controller 1310. The memory device 1360 has a data input D for receiving the output of the comparator COMP1, a clock input for receiving a clock signal and two output Q and $\overline{Q}$ for providing enabling signals EN_M7 and EN_M6 respectively.

The first Buck Boost PWM controller 1320 has a first input for receiving the output Verror_HI of the first differential amplifier EA1, a second input for receiving a clock signal CLK_BUCK, a third input for receiving a clock signal CLK_BOOST and two outputs for providing PWM signals BU_HS_ON_1 and BO_LS_ON_1 respectively. Similarly, the second Buck Boost PWM controller 1330 has a first input for receiving the output Verror_MAIN of the battery charger controller 1310, a second input for receiving the clock signal CLK_BUCK, a third input for receiving the clock signal CLK_BOOST and two outputs for providing PWM signals BU_HS_ON_2 and BO_LS_ON_2 respectively.

The multiplexer 1340 has four inputs for receiving the PWM signals of the PWM controllers 1320 and 1330 and two outputs for providing signals M1_ON and M5_ON respectively. Two inverters 1342 and 1344 are provided at the output of the multiplexer 1340 for inverting the M1_ON signal (M2_ON) and the M5_ON signal. Two AND gates 1362 and 1368 are provided at the output of the memory device 1360. The first AND gate 1362 has a first input for receiving EN_M6, a second input for receiving the inverse of M5_ON and an output for providing M6_ON. The second AND gate 1368 has a first input for receiving EN_M7, a second input for receiving the inverse of M5_ON and an output for providing M7_ON. The driver 1350 has five inputs for receiving signals M1_ON, M2_ON, M5_ON, M6_ON, M7_ON and five outputs for providing driving signals M1_GATE, M2_GATE, M5_GATE, M6_GATE, M7_GATE respectively.

In operation, the controller 1300 causes energy to be delivered to only one of the two outputs 414, 416 during a single switching cycle. This is in contrast with the operation described with respect to FIGS. 6B, 7B and 8B, in which the inductor current supplies energy to both outputs 414 and 416 during a single switching cycle.

If an external supply is connected to the first port 412 to provide a voltage VIN, then the controller 1300 operates the regulator to distributes the inductor energy between the two outputs 414 and 416. The inductor energy is transferred to the third port 416 directly, hence more efficiently.

The controller 1300 causes the buck-boost converter to alternate between operating with the third port (VHI) as the output or the second port (VMAIN) as the output. The battery charger controller 1310 provides a voltage Verror_MAIN. The value of Verror_MAIN is determined by the error amplifier with the lowest output among EA_error2, EA_error3 and EA_error4. The error amplifiers EA1, EA3 and the comparator COMP1 are then used to determine which port among the second and the third port should be prioritized.

The switching converter is regulated either by VHI or by VMAIN via the error signals Verror_HI and Verror_MAIN respectively. The error signal with the highest value controls the power stage. The hysteresis of the comparator COMP1 and the bandwidth of the control loop determine the ripple on each output voltage. For instance, ripples can be minimized by reducing the comparator hysteresis and/or by increasing the bandwidth of the control loops.

Figure 14:
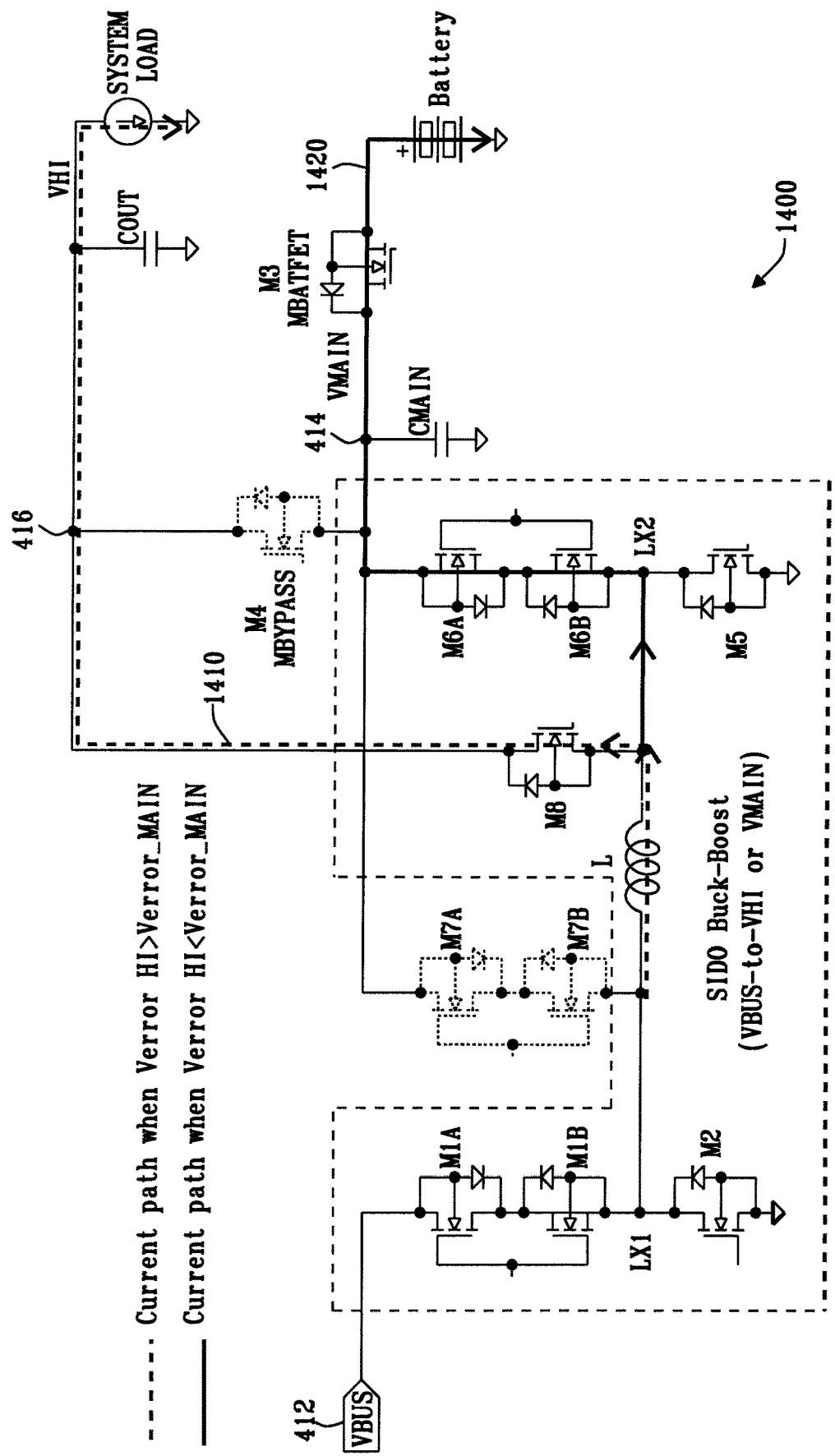
FIG. 14 is a diagram illustrating the operation of the charger of FIG. 4 when operated by the controller of FIG. 13.

FIG. 14 is a diagram illustrating the operation of the charger of FIG. 4 when operated by the controller of FIG. 13. In this case the regulator circuit is configured as a SIDO buck-boost converter. The first port 412 receives the voltage VIN, the second port 414 has a voltage VMAIN and the third port 416 has a voltage VHI. The switches M4 and M7 are turned off (open) while the switches M3 is turned on (closed). The switches M1, M2, M5, M6 and M8 are operated to magnetize and demagnetize the inductor L to distribute energy from the input port 412 either to the second port 414 or to the third port 416.

When the error signal Verror_HI>Verror_MAIN, the inductor current is provided to the third port 416 along a path 1410 via the switch M8. When the error signal Verror_HI<Verror_MAIN, the inductor current is provided to the battery 430 at the second port 414 along a path 1420 via the switches M6 and M3.

Figure 15:
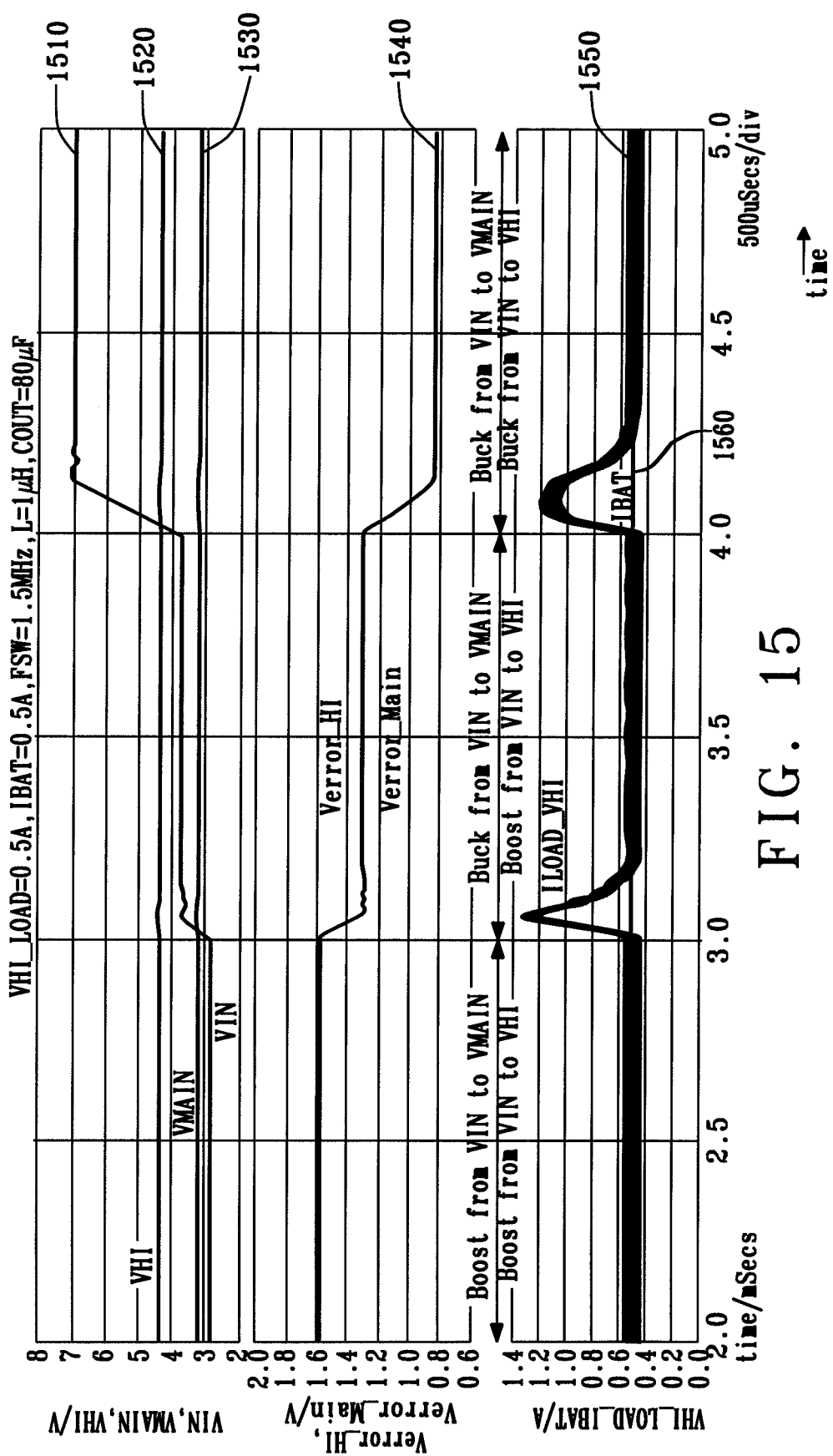
FIG. 15 is a simulation of the operation of the SIDO converter of FIG. 14 illustrating the transition from boost mode to buck-boost mode and finally to buck mode.

FIG. 15 is a simulation of the operation of the SIDO converter of FIG. 14 illustrating the transition from boost mode to buck-boost mode and finally to buck mode. FIG. 15 shows the simulations of the voltages VIN 1510, VHI 1520 and VMAIN 1530, the error signals Verror_HI, Verror_MAIN 1540, the current load ILOAD_VHI 1550, and the battery current IBAT 1560. The following operating conditions were used in the simulation: VIN=2.8V, 3.7V and 7V (step values); VHI=4.35V; VBAT=3.15V; IBAT=0.5 A; System Load=0.5 A (on VHI); FSW=1.5 MHz; L1=1 uH; COUT=80 uF; COMP1 Hysteresis=10 mV.

Figure 16:
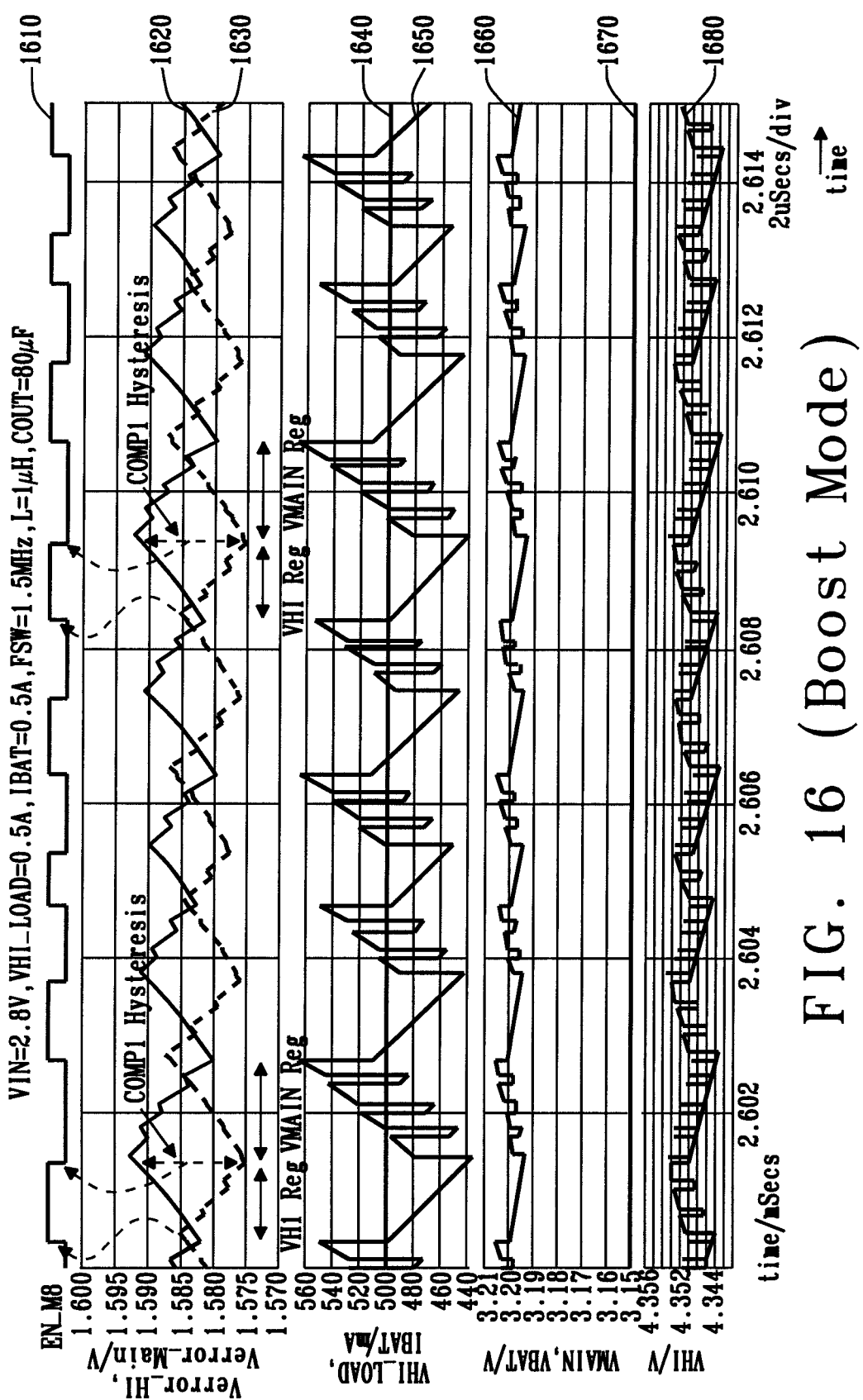
FIG. 16 is a close-up of the simulation of FIG. 15 when operating in boost mode.

FIG. 16 is a close up, over a time window of about 16 μs, of the simulation of FIG. 15 when the switching converter operates in boost mode. The simulation shows the enable signal 1610 for enabling the switch M8, the error signals Verror_HI 1620 and Verror_MAIN 1630, the battery current IBat 1640, the voltages VHI_Load 1650, VMAIN 1660, Vbat 1670 and VHI 1680. FIG. 16 shows that the SIDO converters alternates between VMAIN regulation and VHI regulation. The VHI regulation occurs when Verror_MAIN 1630 is slightly greater than Verror_HI 1620. The VMAIN regulation occurs only after Verror_HI 1620 has exceeded Verror_MAIN by a value dictated by the comparator's hysteresis voltage (COMP1 in FIG. 13).

Figure 17:
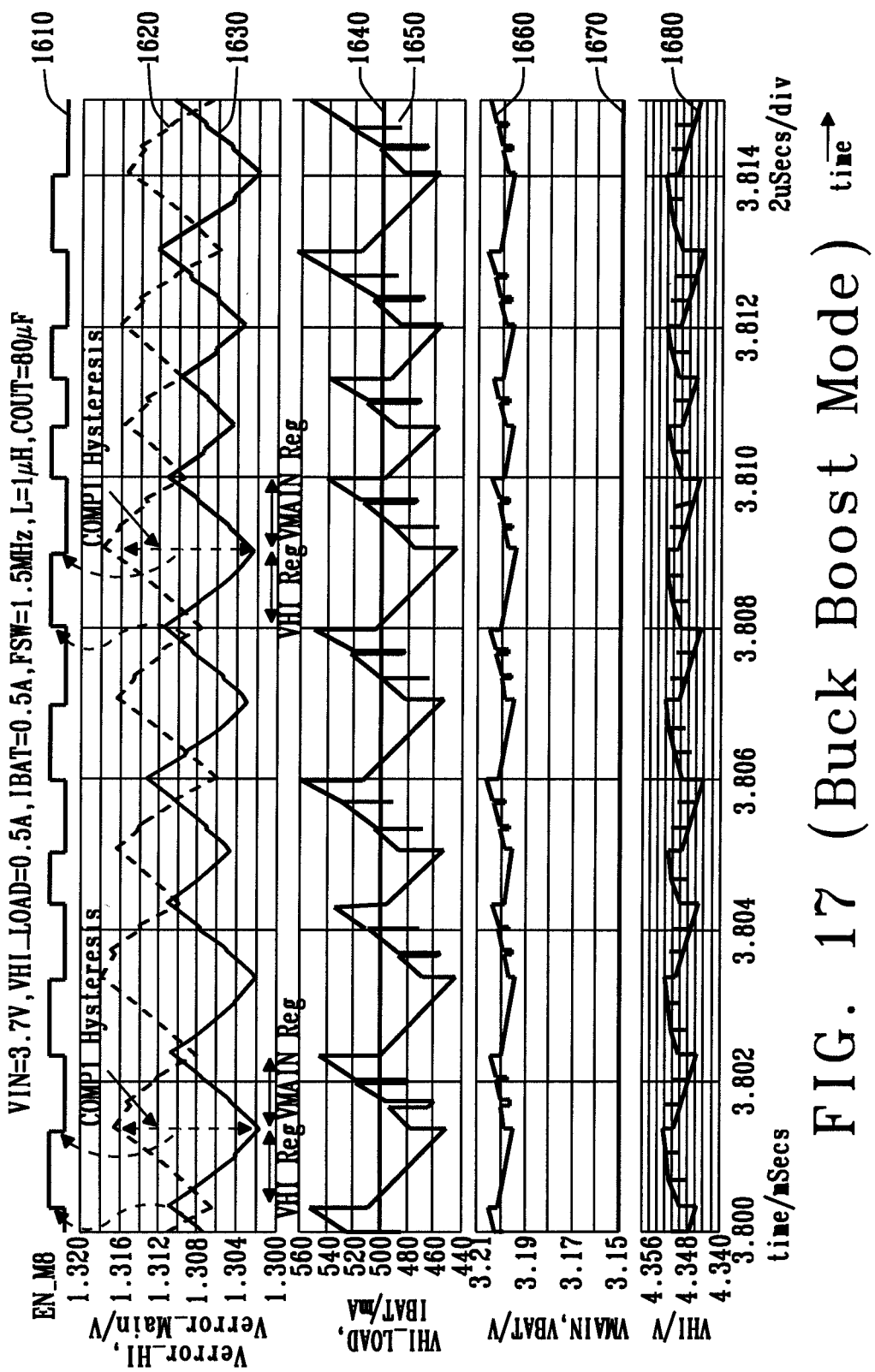
FIG. 17 is a close-up of the simulation of FIG. 15 when operating in buck-boost mode.

FIG. 17 is a close-up of the simulation of FIG. 15 when operating in buck-boost mode.

Figure 18:
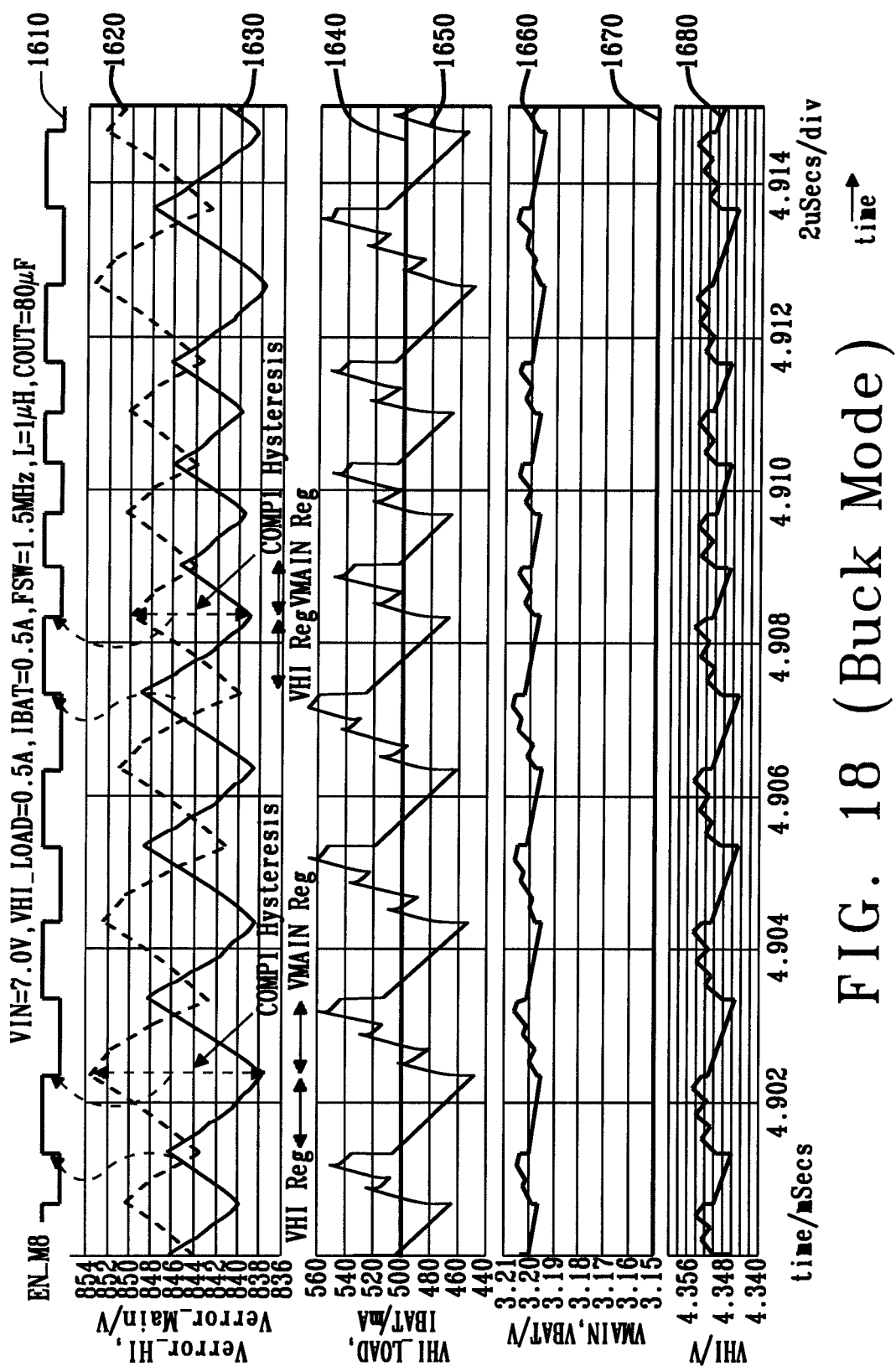
FIG. 18 is a close-up of the simulation of FIG. 15 when operating in buck mode.

FIG. 18 is a close-up of the simulation of FIG. 15 when operating in buck mode.

Figure 19:
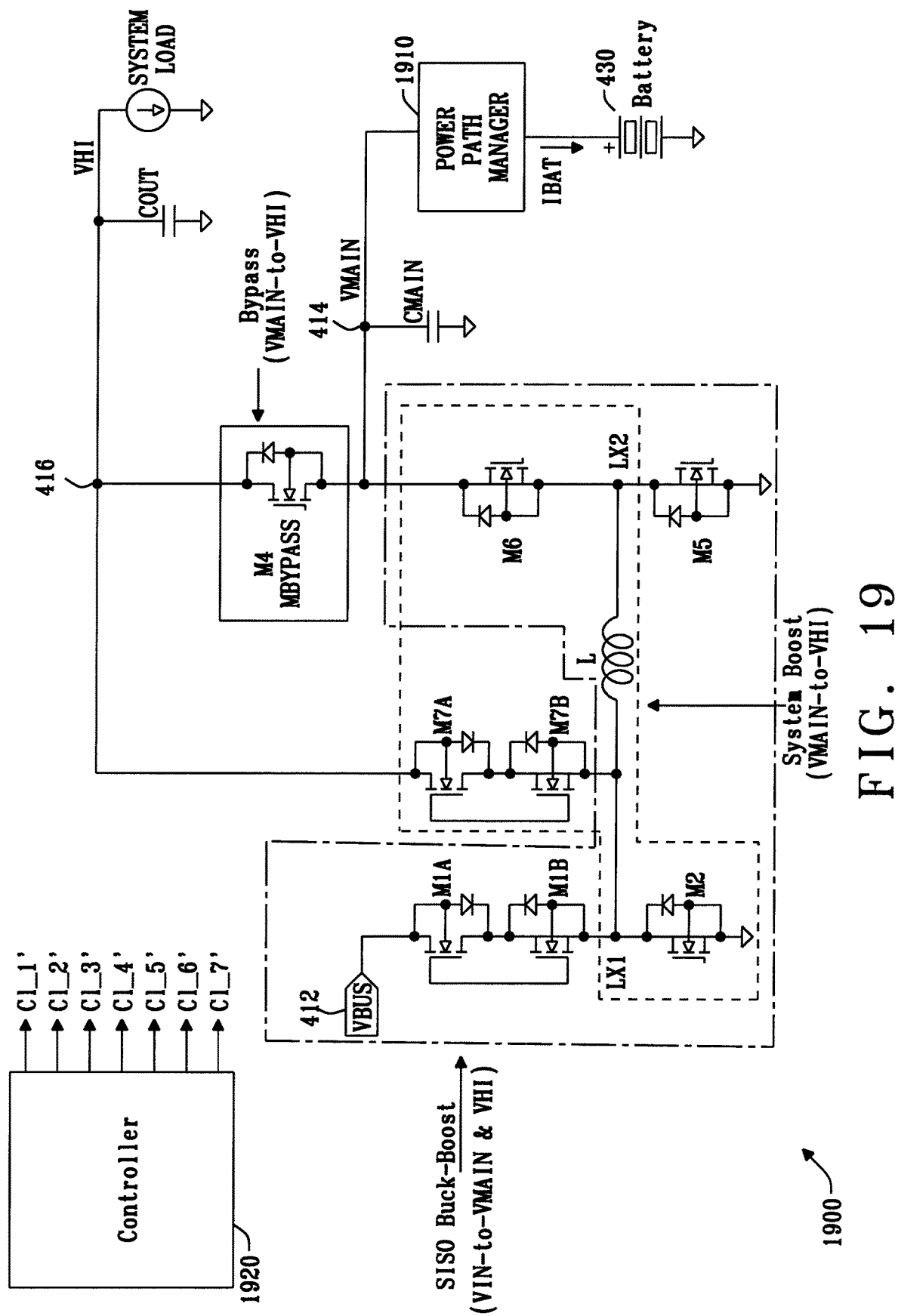
FIG. 19 is a diagram of another charger according to the disclosure.

FIG. 19 shows a diagram of another charger. The charger 1900 is similar to the charger 400 described with reference to FIG. 4, in which certain parts of the circuit have been modified. The components representing similar components to those illustrated in FIG. 4 are represented with the same references and their description will not be repeated for sake of brevity. The charger 1900 includes a power path manager circuit also referred to as current adjuster 1910 for adjusting the battery current IBAT. Compared with the charger 400, the charger 1900 does not require the switch M8 and the battery switch M3 is included as part of the power path manager circuit 1910. Another difference lies in the coupling of switch M7 which connects the first switching node LX1 to the third port 416 instead of the second port 414. The controller 1920 is adapted to generate seven control signals labelled CL_1' to CL_7' for controlling the switches M1 to M7 respectively. The controller 1920 may be adapted to operate the switching converter as a SISO buck-boost using the inductor L and the switches M1, M2, M5 and M6. The controller 1920 may also be adapted to operate the switching converter as a system boost converter using inductor L and switches M2, M6 and M7.

The circuit of FIG. 19 provides superior efficiency, compared with the previous embodiments, when the battery voltage VBAT is equal to the termination voltage VTERM of the battery. The terminal voltage VTERM corresponds to a maximum charge voltage of the battery. As the battery is charged with a constant current, its voltage increases. When VBAT increases to the terminal voltage VTERM, then charging should be stopped to prevent the battery from overcharging, which in turn may lead to irreversible damages. When the battery is fully charged, VBAT will equal VMAIN.

Figure 20:
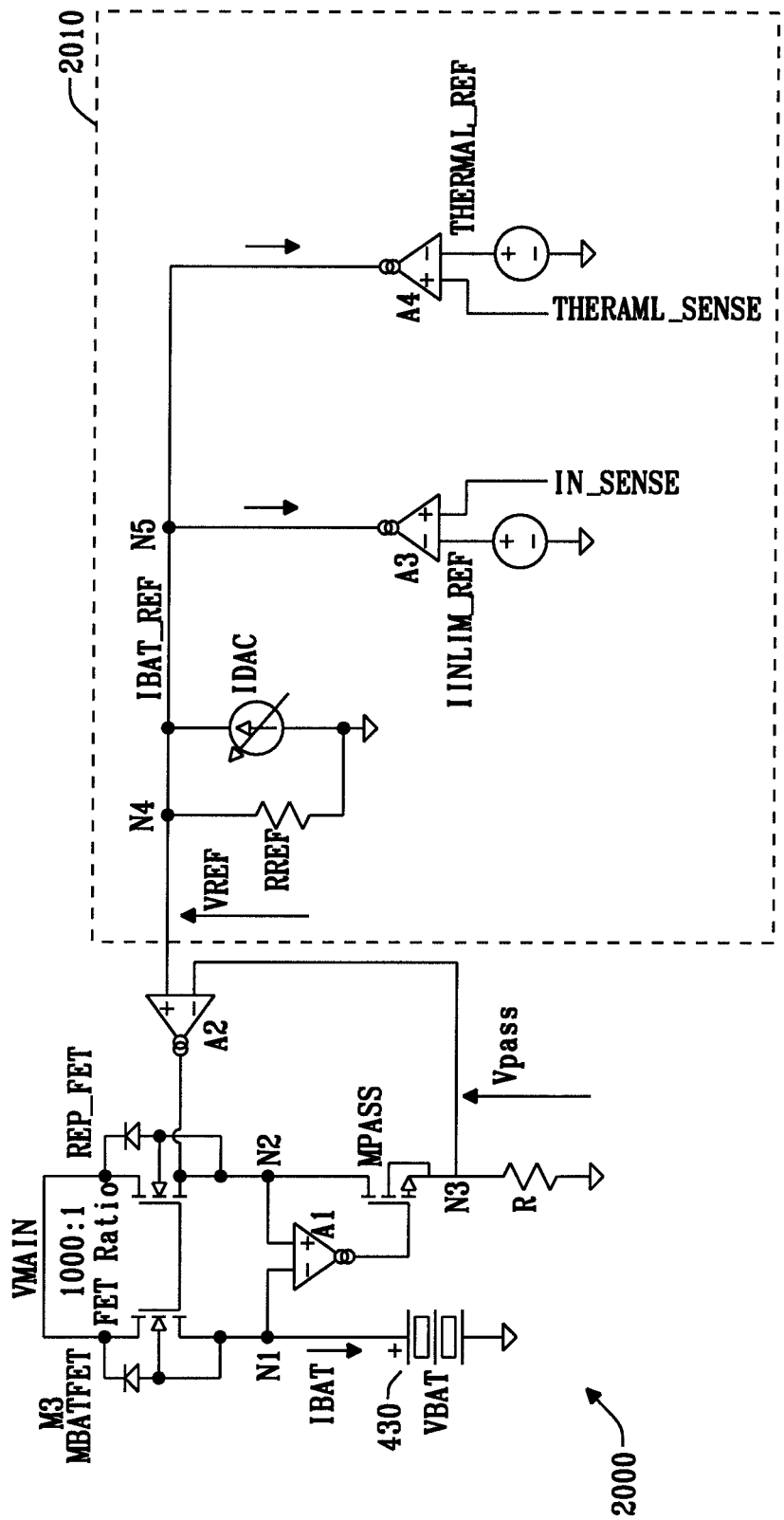
FIG. 20 is a diagram of a power path manager circuit for operating the regulator circuit of FIG. 19 as a SISO buck-boost converter.

FIG. 20 shows an exemplary implementation of a power path manager circuit for use in the SISO buck-boost converter 1900. The power path manager 2000 includes a current mirror having a first output coupled to the battery 430 and a second output coupled to ground via a pass transistor MPASS. A first differential amplifier A1 is provided to control MPASS. The current mirror is coupled to a reference circuit 2010 via a second differential amplifier A2.

The current mirror is formed by two switches, the battery switch MBATFET (M3) and a repetition switch REPFET. The transistor MBATFET has a drain terminal coupled to VMAIN and a source terminal coupled to the battery 430 at node N1. Similarly, the transistor REPFET has a drain terminal coupled to VMAIN and a source terminal coupled to the pass transistor MPASS at node N2. The first differential amplifier A1 has an inverting input coupled to N1, a non-inverting input coupled to N2 and an output coupled to the gate terminal of transistor MPASS. The source terminal of transistor MPASS is coupled to ground via a resistor at node N3.

The second differential amplifier A2 has an inverting input coupled to the source terminal of MPASS at node N3, a non-inverting input coupled to the output of reference circuit 2010 at node N4 and an output coupled to the gate terminals of MBATFET and REPFET.

The reference circuit 2010 includes a reference resistance RREF coupled in parallel with a current DAC, IDAC between the node N4 and ground, and two differential amplifiers A3 and A4. The third differential amplifier A3 has an inverting input coupled to an input current reference IINLIM_REF, a non-inverting input for receiving the input current IN, and an output coupled to node N4. A thermal sensor, not shown, is provided to generate a voltage THERMAL_SENSE proportional to the temperature of the regulator circuit. The fourth differential amplifier A4 has an inverting input coupled to a reference voltage THERMAL_REF, a non-inverting input for receiving the voltage THERMAL_SENSE, and an output coupled to node N4.

In operation, the regulator 1900 operates either in a buck-boost mode when an external supply is connected to the first port 412, or in a bypass/boost mode when no external supply is provided.

When an external supply is provided, the regulator 1900 operates in the buck-boost mode and the power path manager 1910 is in operation. The controller 1920 turns on the bypass switch M4 MBYPASS fully so that VHI=VMAIN and modulates the duty cycle of the buck-boost to maintain VHI≥VHI_MIN. The voltages VMAIN and VHI are regulated to be between VHI_MIN and the charge termination voltage of the battery, VTERM; with VTERM≥VHI_MIN.

If VBAT≥VHI_MIN, then the battery switch BATFET M3 is turned on fully and the duty cycle is modulated to either i) limit the battery voltage VBAT to the charge termination voltage VTERM or ii) to maintain the charging current into the battery at the desired level. When the switch M3 BATFET is fully-ON, the efficiency of the regulator 1900 is better than the regulator 1400 or 400 described above.

If VBAT<VHI_MIN, then the gate of the battery switch MBATFET M3 is modulated by the power path manager 1910 so that MBATFET operates as a voltage controlled current source. The error amplifier A2 compares the reference voltage VREF provided by the reference circuit 2010 with the voltage Vpass at node N3 and provides a control signal to control the gates of transistors MBATFET and REP_FET. The voltage Vpass is proportional to the battery current IBAT.

The switch MBYPASS M4 is turned on fully so that VHI=VMAIN. The power dissipation associated with the battery switch MBATFET can be expressed as:

Pdiss(M3)=(VMAIN−VBAT)*IBAT, in which IBAT is the battery current.

If VBAT<<VH_MIN or if IBAT is relatively large, then Pdiss(M3) is significant. As a result IBAT should be controlled to limit power dissipation.

The voltage reference VREF at node N4 is modulated by adjusting the current IBAT_REF flowing through RREF. This is achieved using the error amplifiers A3 and A4. The error amplifier A4 is used to maintain the power dissipation below an acceptable level by comparing the temperature obtained by a temperature sensor (not shown) with a reference temperature. The error amplifier A3 is used to ensure that when VBAT<VHI_MIN, the regulation of IBAT does not take precedence over maintaining VHI≥VHI_MIN when the external source is sourcing its maximum output current. The error amplifier A3 compares a sensed input current with the predefined maximum current level IINLIM_REF and provides an output which causes IBAT to reduce whenever the input current increases beyond the max threshold IINLIM_REF.

The current sensing circuitry for monitoring the input current provided to the buck-boost can be implemented in different ways known to the skilled person.

If an external supply is not present, the regulator 1900 operates in a bypass mode (BYPASS FET fully-ON) when VBAT≥VHI_MIN, or in a boost mode if VBAT<VHI_MIN. In the bypass mode, the battery switch MBATFET and the bypass switch MBYPASS FET M4 are both turned on fully. In the boost mode, the battery switch MBATFET is fully-ON and the bypass switch MBYPASS is OFF. The controller 1920 regulates VHI to be equal to VHI_MIN. In this case, M6 is ON all the time and the switches M2 and M7 are operated to provide boost function. During boost operation the power path manager is not needed and may be disabled.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

What is claimed is:

1. A power management circuit comprising a switching converter coupled to a controller for operating the switching converter in a plurality of modes, the switching converter comprising
   a first set of switches coupled to a first terminal for receiving an input voltage;
   a second set of switches coupled to a second terminal for coupling to a battery;
   a bypass switch coupled between the second terminal and a third terminal for coupling to a load;
   a single inductor, the single inductor being provided between a first switching node of the first set of switches and a second switching node of the second set of switches;
   a transition switch provided between the first switching node and the second or the third terminal; and
   a ramp generator configured to provide a plurality of ramp signals;
   wherein the controller is configured to select a mode of operation by changing a state of at least one of the bypass switch and the transition switch, the controller being adapted to compare one or more ramp signals with a first error signal to transit between the different modes.

2. The power management circuit of claim 1, wherein the controller is adapted to maintain a voltage at the third terminal at or above a predetermined value.

3. The power management circuit of claim 2, wherein the first error signal is proportional to a difference between a sensed voltage at the third terminal and the predetermined value.

4. The power management circuit of claim 1, wherein the ramp generator is adapted to generate a first ramp signal having a first profile, a second ramp signal having a second profile and a third ramp signal having a third profile.

5. The power management circuit of claim 4, wherein the first and second profiles vary between a base voltage, an intermediate voltage lower than the base voltage and a threshold voltage lower than the base voltage and the intermediate voltage, wherein each profile comprises a first, a second and a third period.

6. The power management circuit as claimed in claim 5, wherein the first ramp signal decreases from the base voltage to the intermediate voltage during the first period, then remains constant during the second period and decreases from the intermediate voltage to a threshold voltage during the third period.

7. The power management circuit of claim 5, wherein the second ramp signal decreases from the intermediate voltage to the threshold voltage during the first period, then remains constant at the base voltage during the second period and decreases from the base voltage to the intermediate voltage during the third period.

8. The power management circuit of claim 5, wherein third profile increases during a fourth period.

9. The power management circuit of claim 5, wherein the controller is adapted to close the bypass switch to operate the switching converter as a single input single output buck converter when the first error signal is less than the threshold voltage.

10. The power management circuit of claim 5, wherein the controller is adapted to open the bypass switch and the transition switch to operate the switching converter as a single input dual output buck converter when the first error signal is between the intermediate voltage and the threshold voltage.

11. The power management circuit of claim 5, wherein the controller is adapted to open the bypass switch and close the transition switch to operate the switching converter as a dual input dual output buck converter when the first error signal is between the intermediate voltage and the base voltage.

12. The power management circuit of claim 5, wherein the controller is adapted to open the bypass switch and close the transition switch to operate the switching converter as a dual input dual output buck-boost converter when the first error signal is greater than the base voltage.

13. The power management circuit of claim 1, wherein the first set of switches comprises a first switch coupled to a second switch at a first switching node; and wherein the second set of switches comprises a third switch coupled to a fourth switch at a second switching node.

14. The power management circuit of claim 13, comprising a fifth switch coupled between the second switching node and the third terminal.

15. The power management circuit of claim 3, wherein the controller is adapted to generate a second error signal based on a difference between the voltage at the second terminal and a reference signal.

16. The power management circuit of claim 15, wherein the controller is adapted to provide the inductor current to the second terminal when the second error signal is greater than the first error signal and to provide the inductor to the third terminal when the second error signal is less than the first error signal.

17. The power management circuit of claim 15, wherein the controller comprises a battery charger controller adapted to generate the second error signal, a comparator adapted to compare the first and second error signal, a driver and a memory device.

18. The power management circuit of claim 1, comprising a current adjuster coupled to the second terminal, the current adjuster being adapted to control a current for charging the battery.

19. The power management circuit of 18, wherein the current adjuster comprises a current mirror coupled to a reference circuit adapted to provide a reference battery voltage.

20. The power management circuit of claim 19, wherein the current adjuster comprises a differential amplifier adapted to control the current flowing through the current mirror based on the reference battery voltage.

21. The power management circuit of claim 18, wherein the controller is adapted to operate the switching converter in a buck-boost mode when a voltage is supplied to the first terminal.

22. A method of managing power comprising
providing a switching converter comprising a first set of switches coupled to a first terminal for receiving an input voltage; a second set of switches coupled to a second terminal for coupling to a battery; a bypass switch coupled between the second terminal and a third terminal for coupling to a load; a single inductor, the single inductor being provided between a first switching node of the first set of switches and a second switching node of the second set of switches; a transition switch provided between the first switching node and the second or the third terminal; and a ramp generator configured to provide a plurality of ramp signals;
selecting a mode of operation by changing a state of at least one of the bypass switch and the transition switch and
comparing one or more ramp signals with a first error signal to transit between the different modes.

* * * * *